(12) United States Patent
Miyagi

(10) Patent No.: US 11,436,602 B2
(45) Date of Patent: Sep. 6, 2022

(54) AUTHENTICATION DEVICE AND CONTROL PROGRAM

(71) Applicant: TOSHIBA TEC KABUSHIKI KAISHA, Tokyo (JP)

(72) Inventor: Daisuke Miyagi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/111,105

(22) Filed: Dec. 3, 2020

(65) Prior Publication Data

US 2021/0241275 A1 Aug. 5, 2021

(30) Foreign Application Priority Data

Feb. 3, 2020 (JP) .............................. JP2020-016323

(51) Int. Cl.
*G06Q 20/40* (2012.01)
*G06Q 20/18* (2012.01)

(52) U.S. Cl.
CPC ......... *G06Q 20/4014* (2013.01); *G06Q 20/18* (2013.01)

(58) Field of Classification Search
CPC ....... G06Q 20/401; G06Q 20/18; G06Q 20/40
See application file for complete search history.

(56) References Cited

U.S. PATENT DOCUMENTS

| | | | | |
|---|---|---|---|---|
| 10,186,124 B1* | 1/2019 | Mullins | ............ | G08B 13/19615 |
| 11,151,481 B1* | 10/2021 | Sun | ........................ | G06Q 20/12 |
| 2016/0070959 A1* | 3/2016 | Sugama | ............. | G06K 9/00369 |
| | | | | 345/619 |
| 2017/0300938 A1 | 10/2017 | Sakata et al. | | |
| 2018/0268391 A1 | 9/2018 | Hayashi | | |
| 2019/0355049 A1* | 11/2019 | Kulkarni Wadhonkar | .................. | |
| | | | | G06Q 20/12 |
| 2020/0074432 A1* | 3/2020 | Valdman | ............. | G06Q 20/047 |

FOREIGN PATENT DOCUMENTS

| | | |
|---|---|---|
| JP | H08-190672 A | 7/1996 |
| JP | 2000-123086 A | 4/2000 |

OTHER PUBLICATIONS

"Narayana Swamy, Smart RFID based interactive Kiosk Cart using wireless sensor node, 2016, IEEE," (Year: 2016).*
Extended European Search Report dated Jun. 9, 2021, mailed in counterpart European Patent Application No. 21152833.6, 8 pages.

* cited by examiner

*Primary Examiner* — Shahid Merchant
*Assistant Examiner* — Gregory M James
(74) *Attorney, Agent, or Firm* — Kim & Stewart LLP

(57) ABSTRACT

In one embodiment, a customer authentication system includes at least one sensor configured to provide location information of people around a product display section. A customer authentication device is configured to provide customer identification information. A processing device is configured to perform location tracking of the people around the product display section based on the location information from the one or more sensors. The number of people in a predetermined area around the first customer authentication device is then determined based on the location tracking. The processing device enables customer authentication via the customer authentication device if only one person is in the predetermined area and disables customer authentication via the customer authentication device if more than one person is present in the predetermined area.

7 Claims, 16 Drawing Sheets

FIG. 3
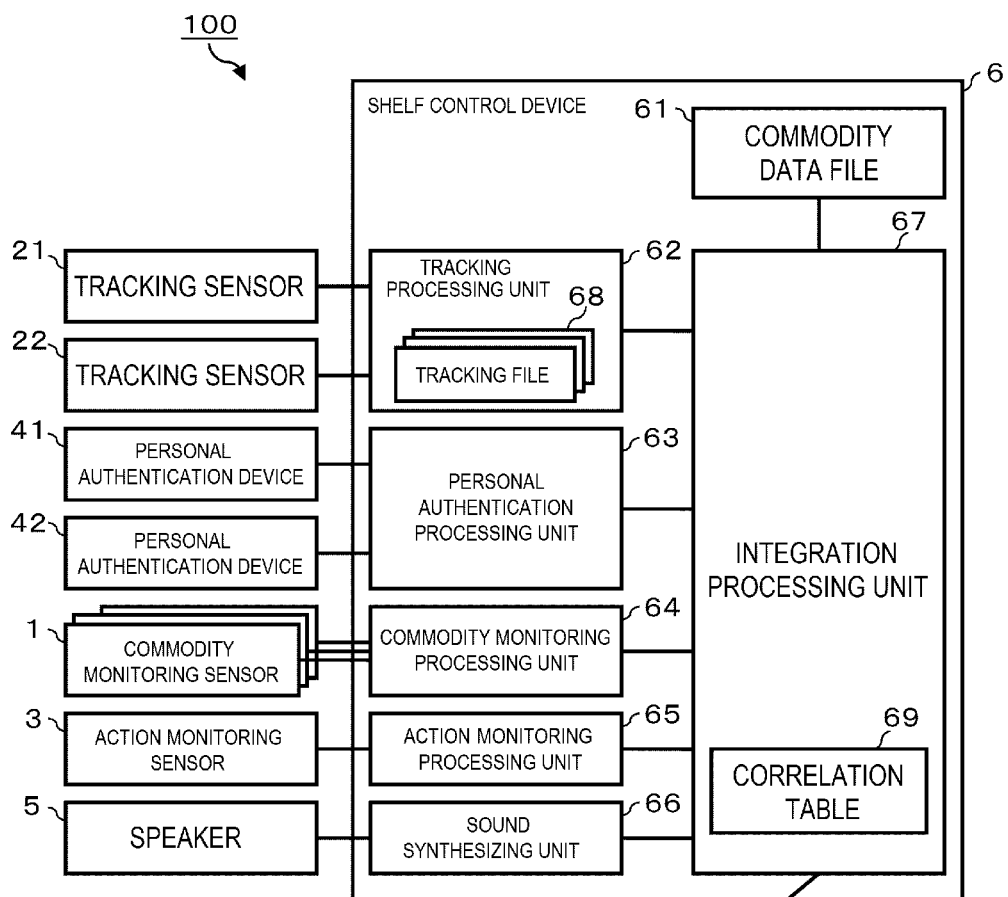
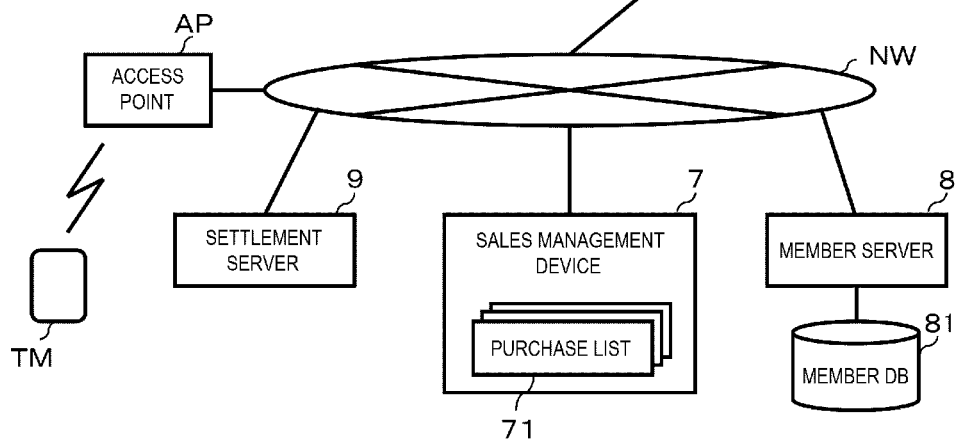

FIG. 4

| COMMODITY CODE | COMMODITY NAME | UNIT WEIGHT | SENSOR NUMBER |
|---|---|---|---|
| 11111111 | COMMODITY A | 500g | 1000001 |
| 22222222 | COMMODITY B | 500g | 1000002 |
| 33333333 | COMMODITY C | 600g | 1000003 |
| 44444444 | COMMODITY D | 650g | 1000004 |
| 55555555 | COMMODITY E | 800g | 1000005 |
| 66666666 | COMMODITY F | 300g | 1000006 |

FIG. 5

| TRACKING ID | |
|---|---|
| TIME | TRACKING POSITION INFORMATION |
|  |  |
|  |  |
|  |  |
| ⋮ | ⋮ |
| MONITORING FLAG | 0/1 |

681 braces the rows from TIME through the ⋮ row.

FIG. 6

| MEMBER ID | TRACKING ID |
|---|---|
|  |  |
|  |  |
|  |  |
| ⋮ | ⋮ |

| MEMBER ID | | | | |
|---|---|---|---|---|
| COMMODITY CODE | COMMODITY NAME | UNIT PRICE | NUMBER OF PIECES | AMOUNT |
|  |  |  |  |  |

SALES MANAGEMENT DEVICE (COMMODITY RETURN NOTIFICATION)

SALES MANAGEMENT DEVICE (SETTLEMENT PERMISSION NOTIFICATION)

AUTHENTICATION DEVICE AND CONTROL PROGRAM

CROSS-REFERENCE TO RELATED APPLICATION

This application is based upon and claims the benefit of priority from Japanese Patent Application No. 2020-016323, filed on Feb. 3, 2020, the entire contents of which are incorporated herein by reference.

FIELD

Embodiments described herein relate generally to an authentication device for customer authentication processing and a control program for an authentication device

BACKGROUND

There are various store systems that automatically register a commodity being purchased by a customer in a store according to actions taken by the customer in the store have been proposed. Such systems make commodity registration at a checkout counter or location unnecessary. As one such store system, there is a system that identifies when an item is removed from a shelf by a customer and deems the removed item to be a commodity being purchased by the customer who removed the item form the shelf. With such a system it can be possible to achieve an unmanned store by introducing a store system of this type in, for example, a convenience store or a small kiosk.

The store system of this type authenticates each customer and tracks actions of the authenticated customers. As a mechanism for authenticating customers, there is a mechanism with a gate at an entrance of the store. An authentication device is placed before the gate, and only those customer that are successfully authenticated by the authentication device can pass into the store through the gate. According to this mechanism, since the all the customers passed through the gate are authenticated customer, the customers of the store can be identified. However, with such a store system, it is necessary to provide a gate at the entrance.

There is also a known mechanism for identifying and authenticating a customer near an authentication device, which can be placed other than at the store entrance. With this type mechanism, it is unnecessary to provide a gate at the entrance. However, if a multiple customers are near the authentication device at the same time, authentication and identification of customers can become confused. As a result, a customer could be authenticated by mistake or in error.

BRIEF DESCRIPTION OF THE DRAWINGS

FIG. 3 is a block diagram illustrating a schematic configuration of the store system.

FIG. 4 is a schematic diagram illustrating an example of data structure of a commodity data file.

FIG. 5 is a schematic diagram illustrating an example of data structure of a tracking file.

FIG. 6 is a schematic diagram illustrating an example of data structure of a correlation table.

FIG. 7 is a schematic diagram illustrating an example of data structure of a purchase list.

DETAILED DESCRIPTION

Embodiments are directed to providing a customer authentication system that can prevent authentication of a customer (also referred to as a consumer) by mistake.

According to an embodiment, a customer authentication system comprises one or more sensors configured to provide location information of one or more persons around a product display section, a first customer authentication device configured to provide customer identification information, and a processing device. The processing device is configured to: perform location tracking of the one or more persons around the product display section based on the location information from the one or more sensors; based on the location tracking, determine a number of persons in a first predetermined area around the first customer authentication device; enable customer authentication via the first customer authentication device when the determined number of persons is one; and disable customer authentication via the first customer authentication device when the determined number of persons is greater than one.

A customer authentication system according to an embodiment is described below with reference to the drawings.

In the present embodiment, a customer authentication system in a store system 100 (see FIG. 3) automatically registers a commodity purchased by a consumer using a technique for specifying, if the commodity is taken out from a shelf 10 (see FIGS. 1 and 2), as a purchaser of the commodity, a consumer who performs an action of taking out the commodity near the shelf 10. The shelf 10 is an example of a commodity display section or a product display section.

First, the shelf 10 used in the store system 100 is described with reference to FIGS. 1 and 2.

Figure 1:
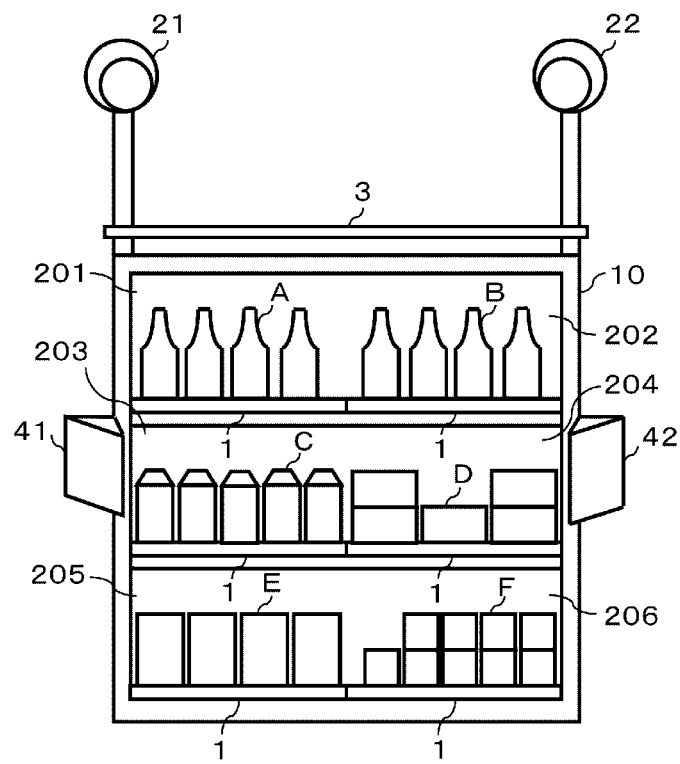
FIG. 1 is a front schematic view of a shelf used in a store system according to an embodiment.

FIG. 1 is a front schematic view of the shelf 10. FIG. 2 is a top schematic view of the shelf 10. As illustrated in FIG. 1, the shelf 10 is a three-stage shelf partitioned by two shelf plates in the up-down direction. Two kinds of commodities are divided into sections and displayed on each of the stages. As an example, commodities A and commodities B are displayed side by side on an upper stage. Commodities C and commodities D are displayed side by side on a middle stage. Commodities E and commodities F are displayed side by side on a lower stage.

In the following explanation, a section on the upper stage left side where the commodities A are displayed is a section 201. A section on the upper stage right side where the commodities B are displayed is a section 202. A section on the middle stage left side where the commodities C are displayed is a section 203. A section on the middle stage right side where the commodities D are displayed is a section 204. A section on the lower stage left side where the commodities E are displayed is a section 205. A section on the lower stage right side where the commodities F are displayed is a section 206.

Commodity monitoring sensors 1 are respectively attached to the sections 201 to 206 in the stages. The commodity monitoring sensors 1 are sensors for monitoring an increase or a decrease in weight involved in movement of a commodity. In the present, weight sensors capable of measuring total weights of commodities displayed in the sections 201 to 206 corresponding to the weight sensors are used as the commodity monitoring sensors 1.

Figure 2:
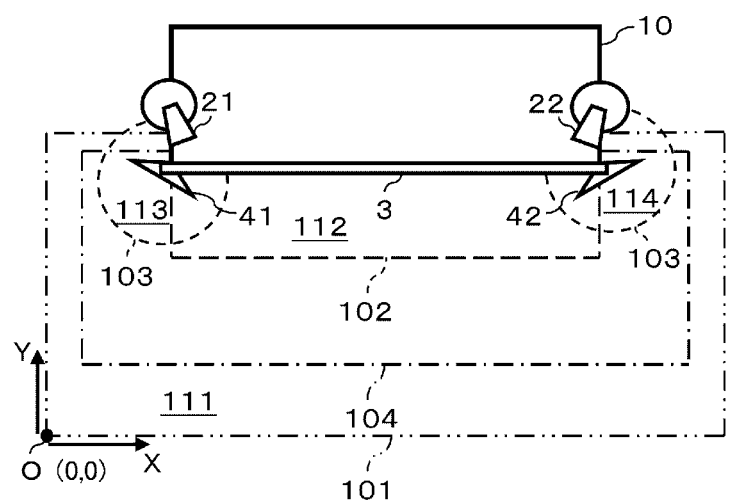
FIG. 2 is a top schematic view of the shelf.

As illustrated in FIGS. 1 and 2, two tracking sensors 21 and 22 and one action monitoring sensor 3 are attached above the shelf 10. The tracking sensors 21 and 22 are separately attached to the left side and the right side of the shelf 10. The action monitoring sensor 3 is attached substantially in parallel to the floor surface along the width direction of the shelf 10 on the front side of the shelf 10.

The tracking sensors 21 and 22 are sensors for tracking a traffic line of a consumer present in a rectangular region 111 surrounded by a first boundary line 101 imaginarily drawn by an alternate long and two short dashes line in FIG. 2. In the following explanation, the region 111 is referred to as tracking region 111. In the present, a camera sensor such as an RGB camera, an IR camera, or an infrared camera capable of photographing the inside of the tracking region 111 is used as the tracking sensors 21 and 22. The number of the tracking sensors 21 and 22 is not limited to two.

The action monitoring sensor 3 is a sensor for monitoring an action on the shelf 10 by a consumer present in a rectangular region 112 surrounded by a second boundary line 102 imaginarily drawn by a broken line in FIG. 2. Specifically, the action monitoring sensor 3 monitors an action of the consumer present in the region 112 stretching a hand to the shelf 10 and an action of retracting the hand. In the following explanation, the action of stretching a hand is referred to as hand stretching action and the action of retracting the hand is referred to as hand returning action. The region 112 is a region where the consumer is assumed to be located when taking out commodities A to F from the shelf 10. In the following explanation, the region 112 is referred to as purchase region 112. The purchase region 112 is inside the tracking region 111. In the present, a TOF (Time of Flight) sensor, a laser radar (lidar), or the like is used as the action monitoring sensor 3. The number of action monitoring sensors 3 is not limited.

As illustrated in FIGS. 1 and 2, personal authentication devices 41 and 42 are attached to both sides of the shelf 10. The personal authentication devices 41 and 42 are devices for performing personal authentication of a consumer. A consumer using a store performs member registration in advance. The member registration is enabled by installing a dedicated application program in a user terminal TM (see FIG. 3) such as a smartphone or a tablet terminal. By performing the member registration, a member ID, which is identification information specific to the consumer, is set in the user terminal TM. In the following explanation, this application program is referred to as shopping application. If the shopping application is started in the user terminal TM in which the member ID is set, a code representing the member ID is displayed on a display of the user terminal TM. The code is represented by, for example, a barcode system or a two-dimensional code system. The personal authentication devices 41 and 42 include readers for reading the code. The number of the personal authentication devices 41 and 42 is not limited to two. Setting places of the personal authentication devices 41 and 42 are not limited to both the sides of the shelf 10.

In FIG. 2, circular regions 113 and 114 surrounded by third boundary lines 103 imaginarily drawn by broken lines are regions where the consumer is assumed to enter in order to cause readers of the personal authentication devices 41 and 42 to read the code of the member ID displayed on the display of the user terminal TM. In the following explanation, the regions 113 and 114 are referred to as authentication regions 113 and 114. The authentication regions 113 and 114 are inside the tracking region 111.

A fourth boundary line 104 is set between the first boundary line 101 and the second boundary line 102. In FIG. 2, the fourth boundary line 104 is imaginarily drawn as an alternate long and short dash line. The store system 100 starts tracking if a consumer enters the tracking region 111. If the consumer enters inside of the fourth boundary line 104, the store system 100 sets a tracking ID for the consumer. If the consumer moves from inside of the fourth boundary line 104 and then exits past the first boundary line 101, the store system 100 ends the tracking of the consumer.

The first to fourth boundary lines 101 to 104 need not necessarily be a sharp or distinct, but rather may have a belt shape having predetermined width. The tracking region 111 and the purchase region 112 may be regions having a shape other than a rectangular shape. The authentication regions 113 and 114 may be regions having a shape other than a circular shape.

The shelf 10 is an example of a commodity display place. The number of stages of the shelf 10 and the number of commodities displayed on the stages are optional. In short, the shelf 10 only has to include a plurality of sections in which the commodities are displayed for each of types of the commodities. The commodity monitoring sensors 1 only have to be individually provided for the sections. Therefore, the display place is not limited to the shelf and may be a display table, a display case, a display space, and the like.

The tracking sensors 21 and 22, the action monitoring sensor 3, and the personal authentication devices 41 and 42 do not always have to be provided in the shelf 10. For example, the tracking sensors 21 and 22 or the action monitoring sensor 3 may be provided in a ceiling or the like of the store. The tracking sensors 21 and 22 only have to be provided in places where a traffic line of a consumer present in the tracking region 111 can be tracked. The action monitoring sensor 3 only has to be provided in a place where an action on the shelf 10 by a consumer present in the purchase region 112 can be monitored. The personal authentication devices 41 and 42 may be provided, for example, near an entrance of the store.

The configuration of the store system 100 is described with reference to FIGS. 3 to 8.

FIG. 3 is a block diagram illustrating aspects of the store system 100. The store system 100 includes a shelf control device 6, a sales management device 7, a member server 8, and a settlement server 9. The store system 100 connects the shelf control device 6, the sales management device 7, the member server 8, and the settlement server 9 to one another with a communication network NW such as a LAN (Local Area Network). The store system 100 is capable of performing, via an access point AP of the communication network NW, wireless communication with the user terminal TM carried by a consumer visiting the store.

The member server 8 manages a member database 81 for saving information relating to a consumer who performs member registration. In the member database 81, names of consumers, terminal information of user terminals TM carried by the consumers, information relating to settlement registered by the consumers, validity flags, and the like are correlated with member IDs of the consumers and saved. The terminal information includes information such as a communication address necessary for performing communication with the user terminals TM via the communication network NW. The information relating to settlement includes information necessary for card settlement performed using a credit card, an electronic money card, or the like or electronic settlement performed using a barcode, a two-dimensional cord, or the like. A validity flag is one-bit data for indicating whether a member ID is valid. In the present example, the validity flag of a valid member ID is represented as "1" and the validity flag of an invalidated member ID is represented as "0". For example, a validity flag correlated with a member ID of a consumer who loses membership is "0".

The settlement server 9 is a server for performing settlement processing such as the card settlement and the electronic settlement described above. A POS (Point Of Sales) terminal may be connected to the settlement server 9. The settlement server 9 may perform the settlement processing via the POS terminal. Well-known processing can be directly applied as the settlement processing. Therefore, specific explanation of the settlement processing is omitted.

The shelf control device 6 has a function of an authentication device. The shelf control device 6 includes a commodity data file 61.

The commodity data file 61 stores data relating to the commodities A to F displayed on the shelf 10. An example of data structure of the commodity data file 61 is illustrated in FIG. 4. As illustrated in FIG. 4, a commodity name, a unit weight, and a sensor number are correlated with commodity codes of the commodities A to F and stored in the commodity data file 61. The unit weight is weight per one commodity. The sensor number is a number for identifying the commodity monitoring sensors 1 provided in each of the sections 201 to 206 of the shelf 10 in which the commodity is displayed. Specific sensor numbers are respectively allocated to the commodity monitoring sensors 1. Data stored in the commodity data file 61 is not limited to the items described above. Data of other items may be stored in the commodity data file 61.

The shelf control device 6 has functions of a tracking processing unit 62, a personal authentication processing unit 63, a commodity monitoring processing unit 64, an action monitoring processing unit 65, a sound synthesizing unit 66, and an integration processing unit 67.

The tracking processing unit 62 receives image data from the tracking sensors 21 and 22. The tracking processing unit 62 analyzes the image data and tracks a traffic line of a consumer present in the tracking region 111. The tracking processing unit 62 stores traffic line data in a tracking file 68 for each of consumers.

An example of data structure of the tracking file 68 is illustrated in FIG. 5. As illustrated in FIG. 5, the tracking file 68 includes an area of a tracking ID, an area of traffic line data 681, and an area of a monitoring flag. The tracking ID is a unique code set by the tracking processing unit 62 in order to identify a tracking target consumer. The traffic line data 681 is data in which tracking position information indicating a place where the tracking target consumer is present and time at that point in time are described in time series. The tracking position information is represented by an X-Y plane coordinate having a left lower corner point of the tracking region 111 as an origin O (0, 0), for example, in FIG. 2. The monitoring flag is one-bit data for indicating whether the tracking target consumer moves from the inner side to the outer side of the fourth boundary line 104. In the present, the monitoring flag stored in the tracking file 68 of a consumer who moves from the inner side to the outer side of the fourth boundary line 104 is represented as "1". The monitoring flag stored in the other tracking files 68 is represented as "0".

The personal authentication processing unit 63 captures data read by the readers of the personal authentication devices 41 and 42 and performs processing relating to personal authentication of a consumer. The personal authentication processing unit 63 performs the processing relating to personal authentication in cooperation with the integration processing unit 67. The personal authentication processing unit 63 outputs an authentication result to the personal authentication devices 41 and 42. The personal authentication devices 41 and 42 have a function of informing an authentication result. For example, the personal authentication devices 41 and 42 include display devices and display the authentication result on the display devices.

The commodity monitoring processing unit 64 receives weight data from the commodity monitoring sensors 1. The commodity monitoring processing unit 64 monitors, based on the weight data, states of the commodities A to F displayed on the shelf 10. Specifically, if the weight data received from the commodity monitoring sensors 1 decreases, the commodity monitoring processing unit 64 recognizes that a commodity is taken out from sections where the commodity monitoring sensors 1 are provided. If the weight data from the commodity monitoring sensors 1 increases, the commodity monitoring processing unit 64 recognizes that a commodity is placed in the sections where the commodity monitoring sensors 1 are provided. A recognition result in the commodity monitoring processing unit 64 is given to the integration processing unit 67.

The action monitoring processing unit 65 receives an output signal from the action monitoring sensor 3. The action monitoring processing unit 65 monitors, based on the output signal, an action on the shelf 10 by a purchaser present in the purchase region 112. Specifically, if a hand of a consumer inserted into the shelf 10 is detected by the action monitoring sensor 3, the action monitoring processing unit 65 recognizes the action as a hand stretching action. If the hand is not detected, the action monitoring processing unit 65 recognizes the action as a hand returning action. A recognition result in the action monitoring processing unit 65 is given to the integration processing unit 67. Action position information of a point where the action monitoring sensor 3 detects the hand is also given to the integration processing unit 67. The action position information is represented by an X coordinate indicating the distance from the origin O of the X-Y plane coordinate and a Z coordinate indicating the height from a floor surface.

A speaker 5 is connected to the sound synthesizing unit 66. The sound synthesizing unit 66 synthesizes sound data according to control by the integration processing unit 67 and outputs the sound data to the speaker 5. Consequently, sound is emitted from the speaker 5. The speaker 5 is set near the shelf 10. The speaker 5 may be set in, for example, a store clerk standby place. Alternatively, the speaker 5 may be incorporated in a terminal carried by a store clerk. The sound synthesized by the sound synthesizing unit 66 may be emitted from the speaker 5. In that case, the sound data synthesized by the sound synthesizing unit 66 is transmitted to the access point AP via the communication network NW and further transmitted to the portable terminal of the store clerk via wireless communication.

The integration processing unit 67 performs data processing necessary for the store system 100 in cooperation with the commodity data file 61, the tracking processing unit 62, the personal authentication processing unit 63, the commodity monitoring processing unit 64, the action monitoring processing unit 65, and the sound synthesizing unit 66. As one of the data processing, there is processing for correlating a consumer whose authentication is successful in the personal authentication processing unit 63 and a consumer whose traffic line is tracked by the tracking processing unit 62. The integration processing unit 67 includes a correlation table 69 as a data table used in this processing.

An example of data structure of the correlation table 69 is illustrated in FIG. 6. As illustrated in FIG. 6, the correlation table 69 includes a region for correlating and storing a member ID of a consumer and a tracking ID set for the consumer.

As one of the data processing executed by the integration processing unit 67, there is processing for specifying an action on a commodity by a consumer based on a tracking result of the tracking processing unit 62 and a monitoring result of the action monitoring processing unit 65. The integration processing unit 67 outputs, based on the action of the consumer specified by this processing, a purchase notification command or a commodity return notification command to the purchase management device 7. The purchase notification command and the commodity return notification command are clarified in explanation of operation below.

The purchase management device 7 includes a purchase list 71. The purchase list 71 is created for each of consumers. An example of data structure of the purchase list 71 is illustrated in FIG. 7. As illustrated in FIG. 7, the purchase list 71 correlates purchased commodity data of a consumer with a member ID of the consumer and stores the purchased commodity data. The purchased commodity data includes items such as a commodity code, a commodity name, a unit price, the number of pieces, and an amount. The amount is calculated by multiplying together the unit price and the number of pieces. The purchased commodity data may include items other than the items described above.

If receiving the purchase notification command, the purchase management device 7 registers the purchased commodity data in the purchase list 71. If receiving the commodity return notification command, the sales management device 7 corrects purchased commodity data corresponding to the commodity return notification command.

Figure 8:
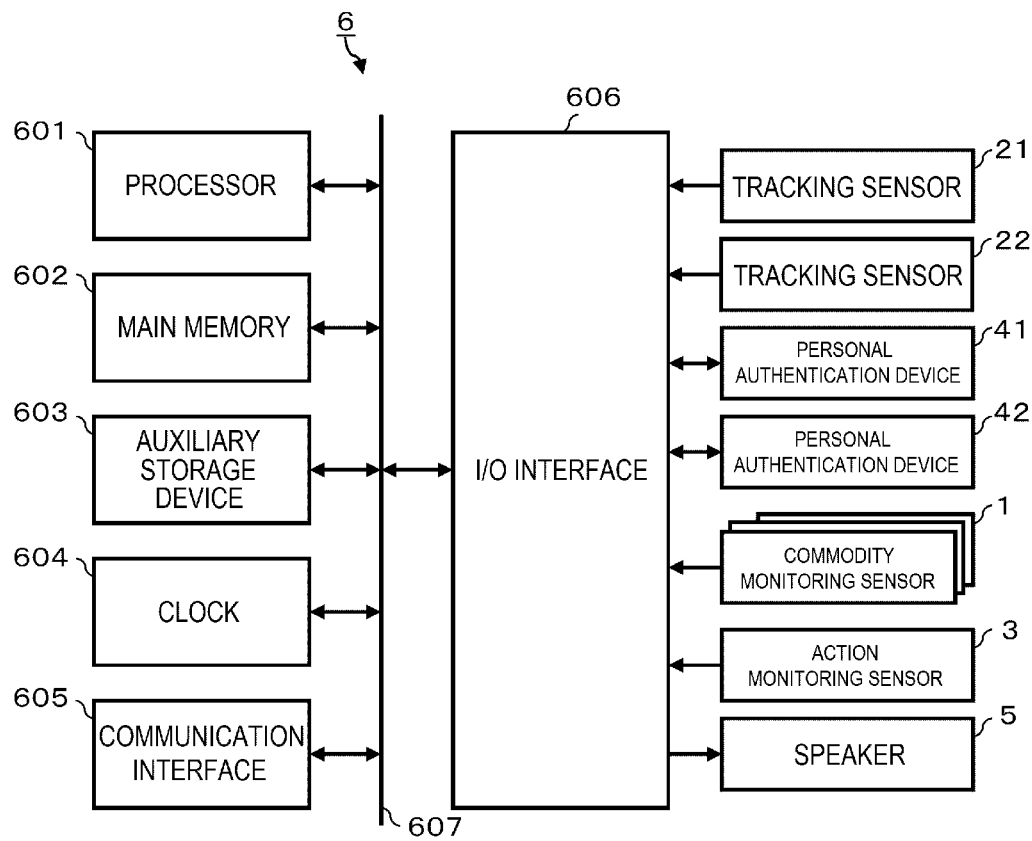
FIG. 8 is a block diagram illustrating a hardware configuration of a shelf control device.

FIG. 8 is a block diagram illustrating a hardware configuration of the shelf control device 6. The shelf control device 6 includes a processor 601, a main memory 602, an auxiliary storage device 603, a clock 604, a communication interface 605, an I/O interface 606, and a system transmission path 607. The processor 601, the main memory 602, the auxiliary storage device 603, the clock 604, the communication interface 605, and the I/O interface 606 are respectively connected to the system transmission path 607. The system transmission path 607 includes an address bus, a data bus, and a control signal line. In the shelf control device 6, the processor 601, the main memory 602, and the auxiliary storage device 603 are connected by the system transmission path 607, whereby a computer for controlling the shelf control device 6 is configured.

The processor 601 can be a main processor of a computer. The processor 601 controls, according to an operating system and/or application programs, the various units and components in order to perform various functions of the shelf control device 6. The processor 601 is, for example, a CPU (Central Processing Unit).

The main memory 602 includes a nonvolatile memory region and a volatile memory region. The main memory 602 stores the operating system or the application programs in the nonvolatile memory region. The main memory 602 stores, in the volatile memory region, data necessary for the processor 601 to execute processing for controlling the units. The main memory 602 uses the volatile memory region as a work area where data is rewritten as appropriate by the processor 601. The nonvolatile memory region is, for example, a ROM (Read Only Memory). The volatile memory region is, for example, a RAM (Random Access Memory).

The auxiliary storage device 603 is equivalent to an auxiliary storage part of the computer. As the auxiliary storage device 603, a well-known storage device such as an EEPROM (Electric Erasable Programmable Read-Only Memory), a HDD (Hard Disk Drive), or an SSD (Solid State Drive) is used alone or a plurality thereof are used in combination. The auxiliary storage device 603 saves data used by the processor 601 in performing various kinds of processing, data created in the processing in the processor 601, or the like. The auxiliary storage device 603 sometimes stores the application programs.

The main memory 602 or the auxiliary storage device 603 can be for storing the tracking file 68, the correlation table 69, and the commodity data file 61.

The clock 604 functions as a time information source of the shelf control device 6. The processor 601 clocks the present date and time based on time information clocked by the clock 604.

The communication interface 605 is a circuit for performing data communication with other devices connected via the communication network NW. The other devices include the sales management device 7, the member server 8, and the settlement server 9.

The I/O interface 606 is a circuit for exchanging data signals between the I/O interface 606 and the commodity monitoring sensors 1, the tracking sensors 21 and 22, the action monitoring sensor 3, the personal authentication devices 41 and 42, and the speaker 5.

The shelf control device 6 having such a configuration is provided, for example, on the upper surface or the rear surface of the shelf 10. The shelf control device 6 is connected to the communication network NW by wired communication or wireless communication.

The computer including the processor 601 performs data processing according to a control program installed in the main memory 602 or the auxiliary storage device 603 to thereby perform functions of the tracking processing unit 62, the personal authentication processing unit 63, the commodity monitoring processing unit 64, the action monitoring processing unit 65, the sound synthesizing unit 66, and the integration processing unit 67. The operations of the tracking processing unit 62, the personal authentication processing unit 63, the commodity monitoring processing unit 64, the action monitoring processing unit 65, the sound synthesizing unit 66, and the integration processing unit 67 are described with reference to flowcharts of FIGS. 9 to 21. Explanation of the operations will clarify the functions of the units. The following explanation is an example. If the same result is obtained, a procedure and the like of the operations are not particularly limited.

A method of installing the control program in the main memory 602 or the auxiliary storage device 603 is not particularly limited. The control program can be installed in the main memory 602 or the auxiliary storage device 603 by recording the control program in a removable recording medium or distributing the control program with communication via a network. A form of the recording medium may be any applicable form if the recording medium can store programs and can be read by a device like a CD-ROM, a memory card, and the like.

Figure 9:
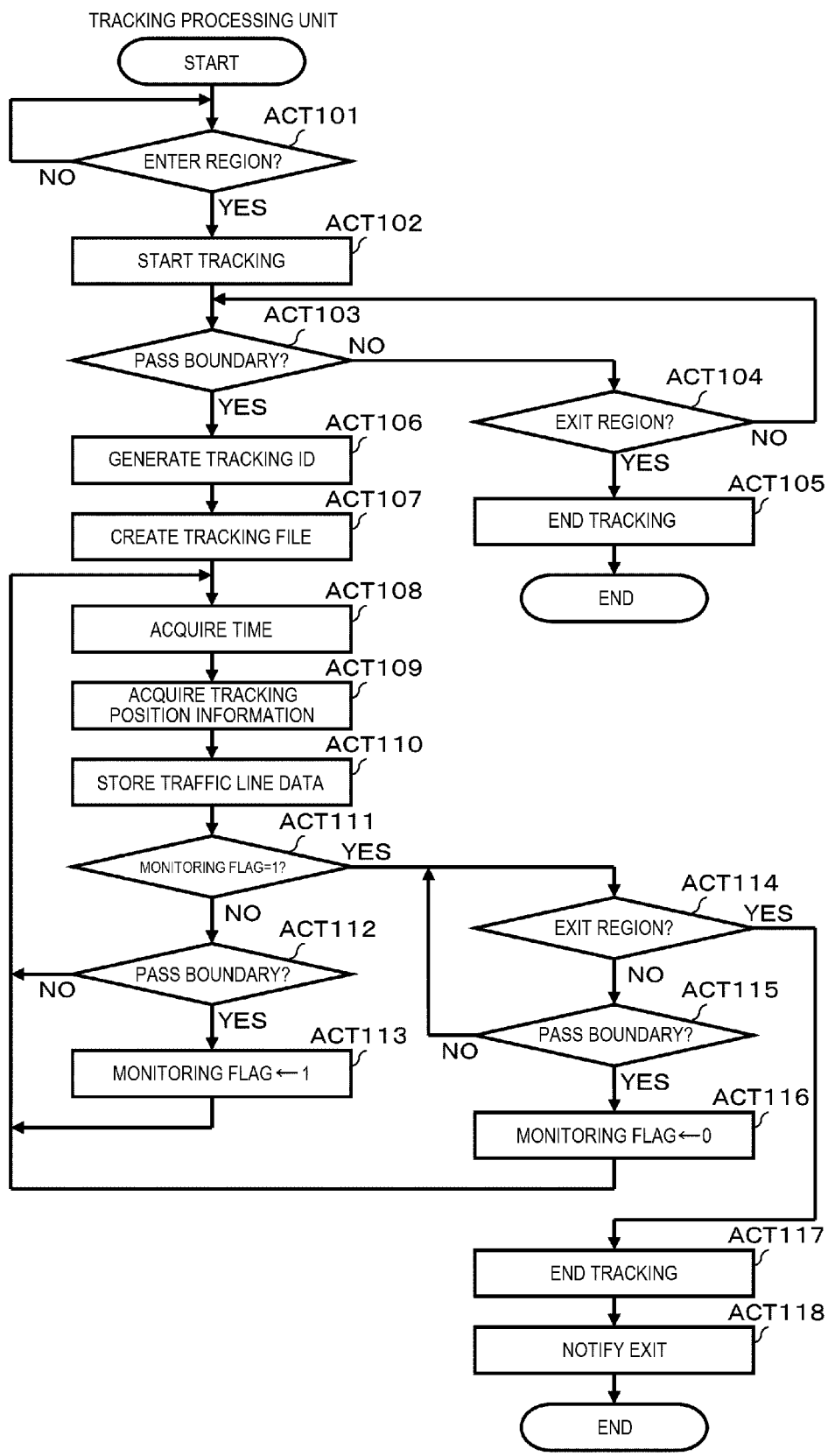
FIG. 9 is a flowchart illustrating an operation procedure of a tracking processing unit.

First, the operation of the tracking processing unit 62 is described with reference to FIG. 9.

In ACT 101, the tracking processing unit 62 waits for a person to cross the first boundary line 101 and enter the tracking region 111. A person entering the tracking region 111 could be a consumer or a store-related person, such as a store clerk. However, for convenience of explanation, here the person is limited to the consumer. Therefore, in the following explanation, any person entering the tracking region 111 is referred to as consumer.

If detecting, according to image data received from the tracking sensors 21 and 22, that a consumer enters the tracking region 111, the tracking processing unit 62 determines YES in Act 101 and the process proceeds to ACT 102. In ACT 102, the tracking processing unit 62 starts tracking of the consumer. In the following explanation, the consumer to be tracked is represented as a consumer SA.

In ACT 103, the tracking processing unit 62 determines whether the consumer SA crosses beyond the fourth boundary line 104 further into the tracking region 111. If the consumer SA does not cross beyond the fourth boundary line 104 further into the tracking region 111, the tracking processing unit 62 determines NO in ACT 103 and the process proceeds to ACT 104. In ACT 104, the tracking processing unit 62 determines whether the consumer SA crosses the first boundary line 101 and thus exits the tracking region 111. If the consumer SA does not exit the tracking region 111, the tracking processing unit 62 determines NO in ACT 104 and the process returns to ACT 103. In ACT 103 and ACT 104, the tracking processing unit 62 waits for the consumer SA to pass beyond the fourth boundary line 104 or exit the tracking region 111.

I the consumer SA exits the tracking region 111, the tracking processing unit 62 determines YES in ACT 104 and the process proceeds to ACT 105. In ACT 105, the tracking processing unit 62 ends the tracking of the consumer SA. Accordingly, the tracking processing unit 62 ends the operation of the procedure illustrated in the flowchart of FIG. 9.

If the consumer SA passes beyond the fourth boundary line 104 and enters further into the tracking region 111, the tracking processing unit 62 determines YES in ACT 103 and the process proceeds to ACT 106. In ACT 106, the tracking processing unit 62 allocates a specific tracking ID to the consumer SA. In ACT 107, the tracking processing unit 62 creates the tracking file 68 associated the tracking ID of the customer SA. At this time, the tracking processing unit 62 sets the monitoring flag to "0". In the following explanation, the tracking file 68 associated with tracking ID of the consumer SA is referred to as a tracking file 680.

In ACT 108, the tracking processing unit 62 acquires time clocked by the clock 604. In ACT 109, the tracking processing unit 62 acquires the present tracking position information (position at the present point in time) for the consumer SA. In ACT 110, the tracking processing unit 62 stores, in the tracking file 680, traffic line data in which the time and the tracking position information are correlated. The traffic line data provides a record of consumer SA movements over time while being tracked.

In ACT 111, the tracking processing unit 62 checks the monitoring flag of the tracking file 680. At this point in time, the monitoring flag is "0". Therefore, the tracking processing unit 62 determines NO in ACT 111 and the process proceeds to ACT 112. In ACT 112, the tracking processing unit 62 determines whether the consumer SA passes the fourth boundary line 104. If the consumer SA does not to enter portion of the tracking region 111 outside the fourth boundary line 104, the tracking processing unit 62 determines NO in ACT 112 and the process returns to ACT 108. The tracking processing unit 62 executes the processing in ACT 108 and subsequent acts in the same manner as described above. That is, the tracking processing unit 62 stores, in the tracking file 680, traffic line data including time clocked by the clock 604 and tracking position information for the consumer SA at different times.

The tracking processing unit 62 repeatedly executes processing for storing the traffic line data in the tracking file 680 until the consumer SA exits past the fourth boundary line 104. If the consumer SA exits past the fourth boundary line 104 into the portion of the tracking region 111 outside the fourth boundary line 104, the tracking processing unit 62 determines YES in ACT 112 and the process proceeds to ACT 113. In ACT 113, the tracking processing unit 62 changes the monitoring flag of the tracking file 680 to "1". The process returns to ACT 108 and the tracking processing unit 62 executes the processing in ACT 108 and subsequent acts again. At this time, since the monitoring flag is "1," the tracking processing unit 62 determines YES in ACT 111 and the process proceeds to ACT 114.

In ACT 114, the tracking processing unit 62 determines whether the consumer SA exits to the outside of the tracking region 111. If the consumer SA does not exit to the outside of the tracking region 111, the tracking processing unit 62 determines NO in ACT 114 and the process proceeds to ACT 115. In ACT 115, the tracking processing unit 62 determines whether the consumer SA crosses the fourth boundary line 104 again and returns to the part of the tracking region 111 inside the fourth boundary line 104. If the consumer SA does not return inside the fourth boundary line 104, the tracking processing unit 62 determines NO in ACT 115 and the process returns to ACT 114. In ACT 114 and ACT 115, the tracking processing unit 62 waits for the consumer SA to exit the tracking region 111 or pass inside the fourth boundary line 104.

If the consumer SA returns to inside the fourth boundary line 104, the tracking processing unit 62 determines YES in ACT 115 and the process proceeds to ACT 116. In ACT 116, the tracking processing unit 62 changes the monitoring flag of the tracking file 680 to "0". The tracking processing unit 62 returns to the processing in ACT 108. Therefore, the tracking processing unit 62 repeatedly executes the processing in ACT 108 to ACT 112 until the consumer SA exits from inside the fourth boundary line 104 again.

If the consumer SA exits the tracking region 111, the tracking processing unit 62 determines YES in ACT 114 and the process proceeds to ACT 117. In ACT 117, the tracking processing unit 62 ends the tracking of the consumer SA. In ACT 118, the tracking processing unit 62 outputs an exit notification command to the integration processing unit 67. The exit notification command includes a member ID of the tracking file 680. Accordingly, the tracking processing unit 62 ends the operation of the procedure illustrated in the flowchart of FIG. 9.

As described above, if the consumer SA pass inside the fourth boundary line 104, the tracking processing unit 62 allocates a specific tracking ID to the consumer SA. The tracking processing unit 62 creates the tracking file 680 to which the tracking ID is associated.

The tracking processing unit 62 starts tracking of the consumer SA. The tracking processing unit 62 continues the tracking until the consumer SA exits the tracking region 111. If the consumer SA exits the tracking region 111, the tracking processing unit 62 ends the tracking of the consumer SA. During the tracking, the tracking processing unit 62 stores traffic line data of the consumer SA in the tracking file 680. If the consumer SA exits the tracking region 111, the tracking processing unit 62 outputs an exit notification command to the integration processing unit 67.

The tracking processing unit 62 functions as a tracking unit that tracks a person moving in the tracking region 111. Specifically, the tracking processing unit 62 allocates a specific tracking ID to the person and tracks the person.

Figure 18:
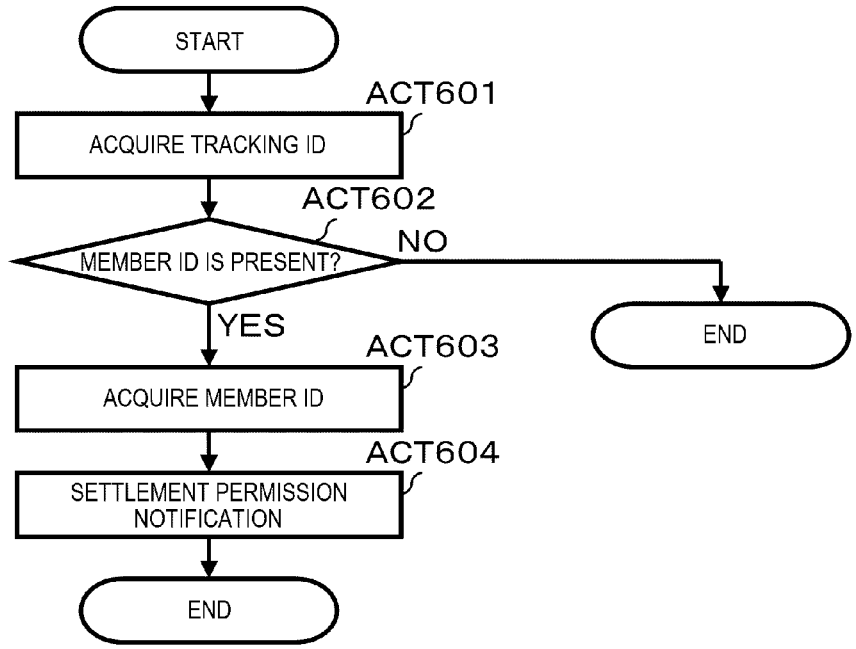
FIG. 18 is a flowchart illustrating an operation procedure of the integration processing unit to which an exit notification command is input.

The operation of the integration processing unit 67, to which the exist notification command is input, is described below with reference to FIG. 18.

The operation of the personal authentication processing unit 63 is described with reference to FIG. 10.

In ACT 201, the personal authentication processing unit 63 waits for data for personal authentication to be read by the reader of the personal authentication device 41 or 42.

The consumer SA needs to receive personal authentication of a member before purchasing commodities. Accordingly, the consumer SA starts a shopping application installed in the user terminal TM. If the shopping application is started, a code of a member ID is displayed on the display of the user terminal TM. Therefore, the consumer SA causes the reader of the personal authentication device 41 or 42 to read the code. Then, the personal authentication device 41 or 42 outputs data indicated by the code to the personal authentication processing unit 63. A device ID for identifying the personal authentication device 41 or 42 is added to the data.

If data is input from the personal authentication device 41 or 42, the personal authentication processing unit 63 determines whether the data is data representing a code of a member ID. If the data is data representing a code of a member ID, the personal authentication processing unit 63 determines YES in ACT 201 and the process proceeds to ACT 202. In ACT 202, the personal authentication processing unit 63 acquires a device ID added to the data. In ACT 203, the personal authentication processing unit 63 acquires the member ID from the data. In ACT 204 the personal authentication processing unit 63 outputs an authentication notification command to the integration processing unit 67. The authentication notification command includes the device ID acquired in the processing in ACT 202 and the member ID acquired in the processing in ACT 203.

The operation of the integration processing unit 67, to which the authentication notification command is input, is described with reference to FIG. 13.

In ACT 501, the integration processing unit 67 acquires the device ID from the authentication notification command. In ACT 502, the integration processing unit 67 selects the authentication region 113 or 114 specified from the device ID. For example, if the device ID is a device ID of the personal authentication device 41, the integration processing unit 67 selects the authentication region 113. For example, if the device ID is a device ID of the personal authentication device 42, the integration processing unit 67 selects the authentication region 114. As an example, the explanation of the operation of the integration processing unit 67 is continued assuming that the authentication region 113 is selected.

In ACT 503, the integration processing unit 67 acquires the number of consumers present in the authentication region 113. Specifically, in cooperation with the tracking processing unit 62, the integration processing unit 67 searches for the tracking file 68 that stores traffic line data in which tracking position information corresponding to time when the authentication notification command is output coincides with authentication position information for the authentication region 113. The number of relevant tracking files 68 is the number of consumers present in the authentication region 113. The authentication position information is an aggregate of X-Y plane coordinates in the authentication region 113. The authentication position information for the authentication region 113 is set in the auxiliary storage device 603 in advance.

In ACT 504, the integration processing unit 67 determines whether the number of consumers present in the authentication region 113 is one. If the number of consumers is one, that is, only the consumer SA is present in the authentication region 113, the integration processing unit 67 determines YES in ACT 504 and the process proceeds to ACT 505. In ACT 505, the integration processing unit 67 acquires the member ID from the authentication notification command. The integration processing unit 67 transmits an authentication request command to the member server 8. The authentication request command includes the member ID acquired in the processing in ACT 505, that is, the member ID of the consumer SA.

The member server 8 determines validity of the member ID. Specifically, the member server 8 searches through the member database 81 with the member ID included in the authentication request command. As a result, if a validity flag corresponding to the member ID is "1", the member server 8 determines that the member ID is valid. If the validity flag corresponding to the member ID is "0", the member server 8 determines that the member ID is invalid. The member server 8 returns a validity determination result of the member ID to the integration processing unit 67.

In ACT 507, the integration processing unit 67 confirms validity of the member ID. If the member server 8 determines that the member ID is the valid member ID, the integration processing unit 67 determines YES in ACT 507 and the process proceeds to ACT 508. In ACT 508, the integration processing unit 67 acquires the tracking ID from the tracking file 680 of the consumer SA present in the authentication region 113. That is, the integration processing unit 67 acquires the tracking ID from the tracking file 68 that stores traffic line data in which tracking position information corresponding to time when the authentication notification command is output coincides with authentication position information for the authentication region 113. In ACT 509, the integration processing unit 67 associates the tracking ID acquired in the processing in ACT 508 and the member ID acquired in the processing in ACT 505 and stores the tracking ID and the member ID in the correlation table 69.

In ACT 510, the integration processing unit 67 instructs the sales management device 7 to create the purchase list 71. According to the instruction, the sales management device 7 creates the purchase list 71 identified by the member ID acquired in the processing in ACT 505. In the following explanation, the purchase list 71 identified by the member ID of the consumer SA is represented as a purchase list 711.

In ACT 511, the integration processing unit 67 outputs an acceptance response command to the personal authentication processing unit 63.

On the other hand, if the integration processing unit 67 determines in ACT 507 that the member is not a valid member, the integration processing unit 67 determines NO and the process proceeds to ACT 512. In ACT 512, the integration processing unit 67 outputs an error response command of an authentication error to the personal authentication processing unit 63.

If no consumer is present in the authentication region 113 or if two or more consumers are present in ACT 504, the integration processing unit 67 determines NO and the process proceeds to ACT 513. In ACT 513, the integration processing unit 67 determines whether a consumer is present in another authentication region 114. Specifically, the integration processing unit 67 searches for, in cooperation with the tracking processing unit 62, the tracking file 68 that stores traffic line data in which tracking position information corresponding to time when the authentication notification command is output coincides with authentication position information for the authentication region 114. If the tracking file 68 is present, the integration processing unit 67 determines that a consumer is present in the authentication region 114.

If a consumer is present in the other authentication region 114, the integration processing unit 67 determines NO in ACT 513 and the process proceeds to ACT 514. In ACT 514, the integration processing unit 67 outputs an error response command of a first proximity error to the personal authentication processing 63. If no consumer is present in the other authentication region 114, the integration processing unit 67 determines YES in ACT 513 and the process proceeds to ACT 515. In ACT 515, the integration processing unit 67 outputs an error response command of a second proximity error to the personal authentication processing unit 63.

Figure 13:
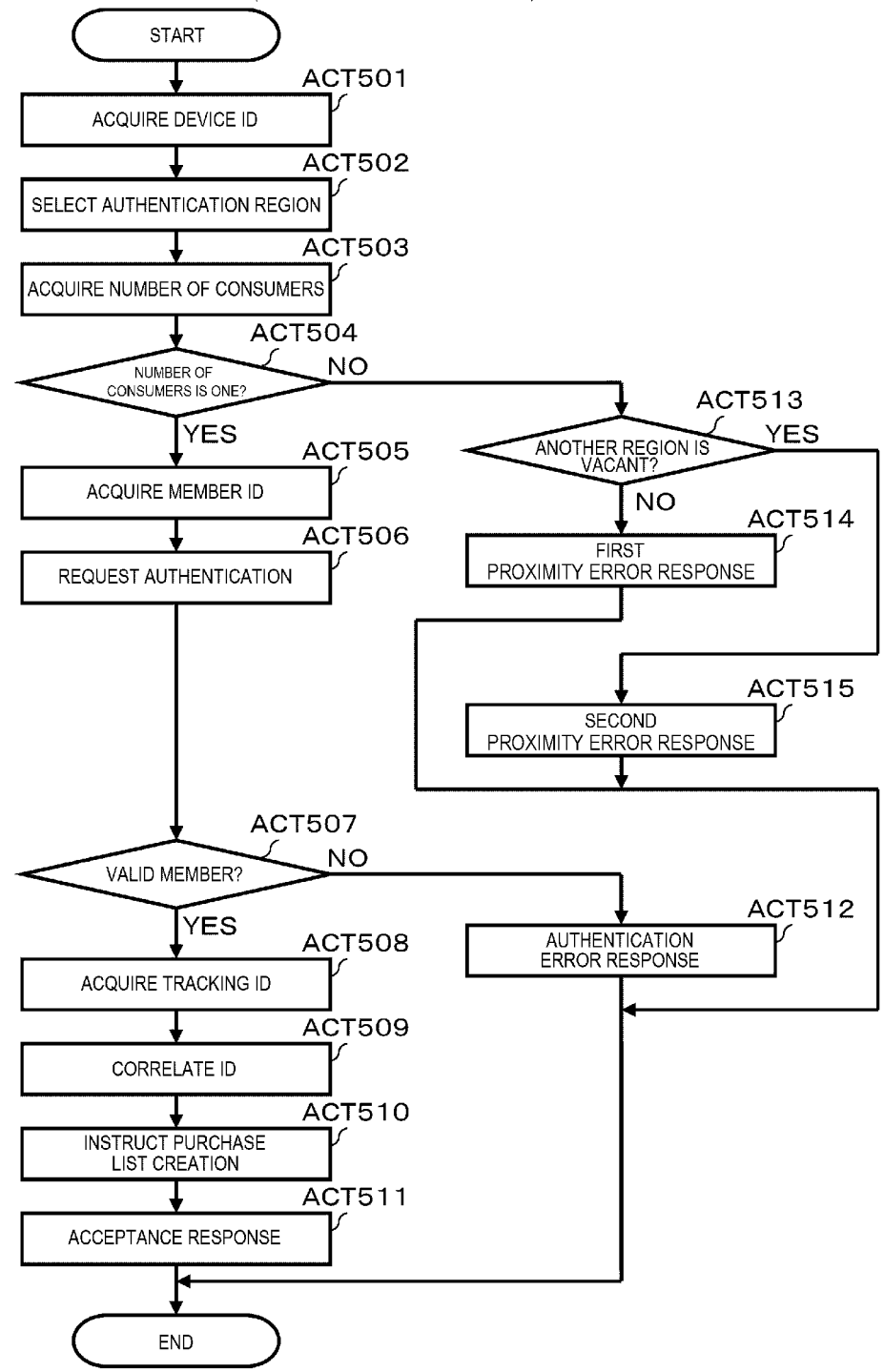
FIG. 13 is a flowchart illustrating an operation procedure of an integration processing unit to which an authentication notification command is input.

If outputting the acceptance response command or the error response command of the authentication error, the first proximity error, or the second proximity error to the personal authentication processing unit 63, the integration processing unit 67 ends the operation of the procedure illustrated in the flowchart of FIG. 13.

Referring back to FIG. 10, in ACT 205, the personal authentication processing unit 63, which outputs the authentication notification command in ACT 204, determines whether the acceptance response command is input from the integration processing unit 67. If the acceptance response command is not input, the personal authentication processing unit 63 determines NO in ACT 205 and the process proceeds to ACT 206. In ACT 206, the personal authentication processing unit 63 determines whether the error response command is input. If the error response command is not input, the personal authentication processing unit 63 determines NO in ACT 206 and the process returns to ACT 205. In ACT 205 and ACT 206, the personal authentication processing unit 63 waits for the acceptance response command to be input or the error response command to be input.

In the waiting state in ACT 205 and ACT 206, if the acceptance response command is input, the personal authentication processing unit 63 determines YES in ACT 205 and the process proceeds to ACT 207. In ACT 207, the personal authentication processing unit 63 controls the personal authentication device 41 such that the success in the authentication is notified from the personal authentication device 41 in the authentication region 113. According to the control, for example, a message "Succeeded in authentication. Please start shopping" is displayed on the display device of the personal authentication device 41.

In the waiting state in ACT 205 and ACT 206, if the error response command is input, the personal authentication processing unit 63 determines YES in ACT 206 and the process proceeds to ACT 208. In ACT 208, the personal authentication processing unit 63 determines whether the error response command is a response command of an authentication error. If the error response command is the response command of the authentication error, the personal authentication processing unit 63 determines YES in ACT 208 and the process proceeds to ACT 209. In ACT 209, the personal authentication processing unit 63 controls the personal authentication device 41 such that the failure in the authentication due to a defect of the member ID is notified from the personal authentication device 41 in the authentication region 113. According to the control, for example, a message "The member ID cannot be used. Please report to a store clerk" is displayed on the display device of the personal authentication device 41.

If the error response command is not the response command of the authentication error, the personal authentication processing unit 63 determines NO in ACT 208 and the process proceeds to ACT 210. In ACT 210, the personal authentication processing unit 63 determines whether the error response command is a response command of a first proximity error. If the error response command is the response command of the first proximity error, the personal authentication processing unit 63 determines YES in ACT 210 and the process proceeds to ACT 211. In ACT 211, the personal authentication processing unit 63 controls the personal authentication device 41 such that re-authentication is instructed from the personal authentication device 41 in the authentication region 113. According to the control, for example, a message "Please perform re-authentication operation after other consumers leave" is displayed on the display device of the personal authentication device 41.

If the error response command is not the response command of the first proximity error, that is, the error response command is a response command of the second proximity error, the personal authentication processing unit 63 determines NO in ACT 210 and the process proceeds to ACT 212. In ACT 212, the personal authentication processing unit 63 controls the personal authentication device 41 such that recommendation for authentication by another personal authentication device is indicated. According to the control, for example, a message "Failed in authentication. We recommend that you perform authentication with another authentication device" is displayed on the display device of the personal authentication device 41.

Figure 10:
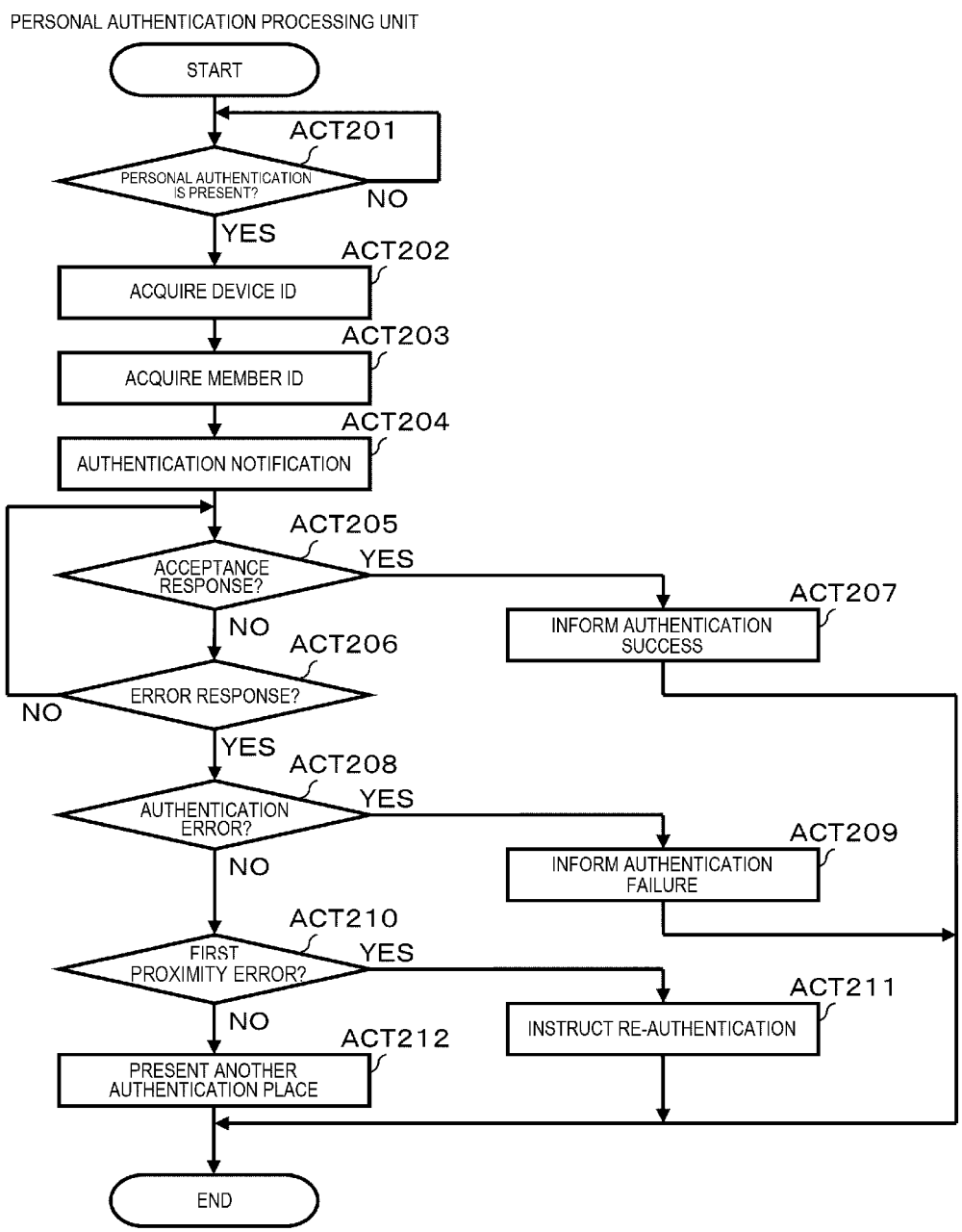
FIG. 10 is a flowchart illustrating an operation procedure of a personal authentication processing unit.

The personal authentication processing unit 63 ends the operation of the procedure illustrated in the flowchart of FIG. 10.

As described above, if the consumer SA enters, for example, the authentication region 113 and causes the reader of the personal authentication device 41 to read the member ID, the personal authentication processing unit 63 outputs the authentication notification command to the integration processing unit 67. According to the authentication notification command, the integration processing unit 67 acquires the number of consumers present in the authentication region 113. If the number is 1, the integration processing unit 67 determines validity of the member ID in cooperation with the member server 8. If the validity of the member ID is approved, the integration processing unit 67 outputs the acceptance response command to the personal authentication processing unit 63. The personal authentication processing unit 63, to which the acceptance response command is input, informs success in authentication via the personal authentication device 41.

On the other hand, if the validity of the member ID is not approved, the integration processing unit 67 outputs the error response command of the authentication error to the personal authentication processing unit 63. According to the error response command, the personal authentication processing unit 63 informs failure in authentication via the personal authentication device 41.

If the number of consumers present in the authentication region 113 is not one, the integration processing unit 67 does not determine the validity of the member ID. In this case, the integration processing unit 67 determines whether a consumer is present in the other authentication region 114. If a consumer is present in the other authentication region 114, the integration processing unit 67 outputs the error response command of the first proximity error to the personal authentication processing unit 63. According to the error response command, the personal authentication processing unit 63 instructs, via the personal authentication device 41, the consumer to perform re-authentication. If no consumer is present in the other authentication region 114, the integration processing unit 67 outputs the error response command of the second proximity error to the personal authentication processing unit 63. According to the error response command, the personal authentication processing unit 63 operates to indicate, via the personal authentication device 41, a message for recommending performing authentication with the other personal authentication device 42.

The integration processing unit 67 functions as an authenticating unit that authenticates a person in cooperation with the personal authentication devices 41 and 42, the personal authentication processing unit 63, and the member server 8. Specifically, the integration processing unit 67 authenticates a person present in the predetermined authentication region 113 or 114 in the tracking region 111.

The integration processing unit 67 functions as an acquiring unit in cooperation with the tracking processing unit 62. That is, the integration processing unit 67 acquires, based on a tracking result in the tracking processing unit 62, persons to be set as targets of authentication, that is, the number of persons present in the present authentication region 113 or 114.

The integration processing unit 67 functions as a control unit. That is, if the number of persons to be set as targets of authentication is one, the integration processing unit 67 allows authentication. The integration processing unit 67 correlates, in the correlation table 69, a user ID, that is, a member ID of the person for whom authentication is allowed and a tracking ID allocated to the person. That is, the integration processing unit 67 functions as a correlating unit.

On the other hand, if the number of persons to be set as targets of authentication is plural, the integration processing unit 67 does not allow authentication. In this case, the integration processing unit 67 instructs re-authentication. Alternatively, the integration processing unit 67 operates to propose authentication in another authentication region where no person is present.

For example, if only the consumer SA is present in the authentication region 113, a consumer whose member ID can be read by the reader of the personal authentication device 41 is limited to the consumer SA. Therefore, the member ID read by the reader and the tracking ID allocated to the consumer SA can be correlated. On the other hand, if another consumer SB other than the consumer SA is present in the authentication region 113, the consumer whose member ID can be read by the reader of the personal authentication device 41 is not limited to the consumer SA. A member ID of the consumer SB can also be read by the reader. Therefore, if the number of consumers present in the authentication region 113 is not one, the integration processing unit 67 does not determine validity of member IDs. As a result, member IDs and tracking IDs are not correlated by mistake.

The consumer SA succeeding in the personal authentication by the member ID can purchase the commodities A to F displayed on the shelf 10. For example, if purchasing the commodity A displayed in the section 201 of the shelf 10, the consumer SA takes out the commodity A from the section 201. In the following explanation, such an action of the consumer SA is referred to as purchasing action. If stopping purchase of the commodity A once taken out from the shelf 10, the consumer SA returns the commodity A to the original section 201. In the following explanation, such an action of the consumer SA is referred to as commodity returning action. The commodity monitoring processing unit 64, the action monitoring processing unit 65, and the integration processing unit 67 operate in cooperation for the purchasing action or the commodity returning action, whereby the shelf control device 6 can register purchased commodity data of the consumer SA in the purchase list 711.

Figure 11:
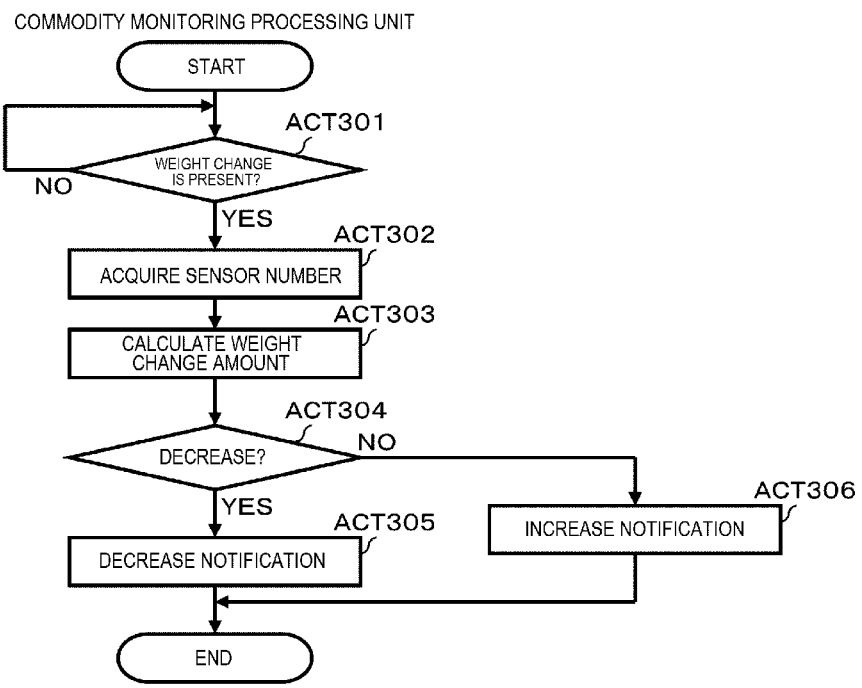
FIG. 11 is a flowchart illustrating an operation procedure of a commodity monitoring processing unit.

Therefore, first, the operation of the commodity monitoring processing unit 64 is described with reference to FIG. 11.

In the purchasing action, an act of the consumer SA simultaneously taking out commodities of a plurality of items is a prohibited act. In the commodity returning action, an act of the consumer SA, without retracting a hand that returns a commodity, taking out the commodity or another commodity is also a prohibited act. An act of the consumer SA simultaneously taking out and returning a plurality of commodities of one item is allowed.

In ACT 301, the commodity monitoring processing unit 64 waits for a weight change to be detected by the commodity monitoring sensors 1. For example, if the consumer SA performs a purchasing action on the commodity A, the commodity monitoring sensor 1 in the section 201 detects a weight change in a decreasing direction. For example, if the consumer SA performs a commodity returning action on the commodity A, the commodity monitoring sensor 1 in the section 201 detects a weight change in an increasing direction.

If the commodity monitoring sensor 1 detects the weight change, the commodity monitoring processing unit 64 determines YES in ACT 301 and the process proceeds to ACT 302. In ACT 302, the commodity monitoring processing unit 64 acquires a sensor number of the commodity monitoring sensor 1 that detects the weight change. In this case, the commodity monitoring processing unit 64 acquires a sensor number, for example, "001" of the commodity monitoring sensor 1 provided in the section 201.

In ACT 303, the commodity monitoring processing unit 64 determines whether the weight change in the decreasing direction is detected or the weight change in the increasing direction is detected by the commodity monitoring sensor 1. If the weight change in the decreasing direction is detected, the commodity monitoring processing unit 64 determines YES in ACT 304 and the process proceeds to ACT 305. In ACT 305, the commodity monitoring processing unit 64 outputs a decrease notification command to the integration processing unit 67.

If the weight change in the increasing direction is detected, the commodity monitoring processing unit 64 determines NO in ACT 304 and the process proceeds to ACT 306. In ACT 306, the commodity monitoring processing unit outputs an increase notification command to the integration processing unit 67.

The decrease notification command or the increase notification command includes the sensor number acquired in the processing in ACT 302 and a weight change amount calculated in the processing in ACT 303. The commodity monitoring processing unit 64 ends the operation of the procedure illustrated in the flowchart of FIG. 11.

Figure 12:
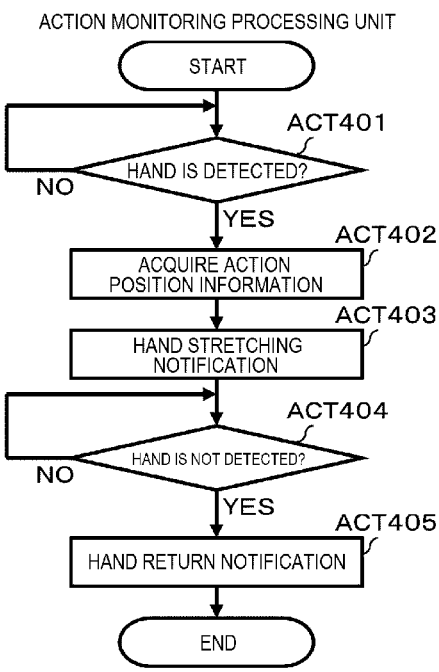
FIG. 12 is a flowchart illustrating an operation procedure of an action monitoring processing unit.

The operation of the action monitoring processing unit 65 is described with reference to FIG. 12.

In ACT 401, the action monitoring processing unit 65 waits for a hand of the consumer SA to be detected by the action monitoring sensor 3. If the consumer SA in the purchase region 112 stretches a hand to the shelf 10, the hand is detected by the action monitoring sensor 3. If the hand is detected, the action monitoring processing unit 65 determines YES in ACT 401 and the process proceeds to ACT 402. In ACT 402, the action monitoring processing unit 65 acquires action position information of a point where the hand of the consumer SA is detected. In ACT 403, the action monitoring processing unit 65 outputs a hand stretching notification command to the integration processing unit 67. The hand stretching notification command includes the action position information acquired in the processing in ACT 402.

In ACT 404, the action monitoring processing unit 65 waits for the hand of the consumer SA to be not detected. If the action monitoring sensor 3 does not detect the hand of the consumer SA, the action monitoring processing unit 65 determines YES in ACT 404 and the process proceeds to ACT 405. The action monitoring processing unit 65 outputs a hand return notification command to the integration processing unit 67. The hand return notification command also includes the action position information acquired in the processing in ACT 402.

As described above, if the consumer SA stretches the hand to the shelf 10 in order to take out the commodity A from the section 201, first, the hand of the consumer SA is detected by the action monitoring sensor 3. According to the detection of the hand, the action monitoring processing unit 65 outputs the hand stretching notification command to the integration processing unit 67. The hand stretching notification command includes the action position information indicating the position where the hand of the consumer SA is detected.

Subsequently, if the consumer SA lifts only one item of the commodity A from the section 201, a weight change in a decreasing direction is detected by the commodity monitoring sensor 1 in the section 201. According to the weight change, the commodity monitoring processing unit 64 outputs a decrease notification command to the integration processing unit 67. The decrease notification command includes a sensor number of the commodity monitoring sensor 1 that detects the weight change and an amount of the weight change. The weight change amount coincides with a unit weight of the commodity A. If the consumer SA lifts two items of the commodity A together from the section 201, a weight change amount coincides with a double of the unit weight of the commodity A.

Thereafter, if the consumer SA retracts the hand, which holds the commodity A, from the shelf 10, the hand of the consumer SA detected by the action monitoring sensor 3 is not detected. According to the non-detection of the hand, the action monitoring processing unit 65 outputs a hand return notification command to the integration processing unit 67. The hand return notification command also includes action position information indicating a position where the hand of the consumer SA is detected.

On the other hand, if the consumer SA holds the commodity A and stretches the hand to the shelf 10 in order to stop the purchase of the commodity A, first, the action monitoring processing unit 65 outputs a hand stretching notification command to the integration processing unit 67.

Subsequently, if the consumer SA returns the commodity A to the section 201, a weight change in an increasing direction is detected by the commodity monitoring sensor 1 in the section 201. According to the weight change, the commodity monitoring processing unit 64 outputs an increase notification command to the integration processing unit 67. The increase notification command includes a sensor number of the commodity monitoring sensor 1 that detects the weight change and an amount of the weight change. The weight change amount coincides with the unit weight of the commodity A. If the consumer SA returns two items of the commodity A to the section 201 together, a weight change amount coincides with a double of the unit weight of the commodity A.

Thereafter, if the consumer SA retracts the hand from the shelf 10, the action monitoring processing unit 65 outputs a hand return notification command to the integration processing unit 67.

As described above, in response to the purchasing action of the consumer SA, first, the action monitoring processing unit 65 outputs the hand stretching notification command to the integration processing unit 67. Subsequently, the commodity monitoring processing unit 64 outputs the decrease notification command to the integration processing unit 67. Thereafter, the action monitoring processing unit outputs the hand return notification command to the integration processing unit 67.

If the consumer SA retracts the hand without picking up a commodity, the decrease notification command is not output. That is, the hand stretching notification command is output. Subsequently, the hand return notification command is output.

On the other hand, in response to the commodity returning action, first, the action monitoring processing unit 65 outputs the hand stretching notification command to the integration processing unit 67. Subsequently, the commodity monitoring processing unit 64 outputs the increase notification command to the integration processing unit 67. Thereafter, the action monitoring processing unit 65 outputs the hand return notification command to the integration processing unit 67.

If the consumer SA retracts the hand without returning a commodity, the increase notification command is not output.

That is, the hand stretching notification command is output. Subsequently, the hand return notification command is output.

In the purchasing action, if the consumer SA does not retract a hand, which lifts a commodity, and returns the commodity to the shelf 10, the action monitoring processing unit 65 and the commodity monitoring processing unit 64 output various commands to the integration processing unit 67 in the following order. First, the action monitoring processing unit 65 outputs the hand stretching notification command to the integration processing unit 67. Subsequently, the commodity monitoring processing unit 64 outputs the decrease notification command to the integration processing unit 67. Subsequently, the commodity monitoring processing unit 64 outputs the increase notification command to the integration processing unit 67. Thereafter, the action monitoring processing unit 65 outputs the hand return notification command to the integration processing unit 67. If the consumer SA returns a commodity to the same section, sensor numbers included in the decrease notification command and the increase notification command coincide. However if the consumer SA returns the commodity of another section, the sensor numbers included in the decrease notification command and the increase notification command are different.

As described above, in response to the purchasing action or the commodity returning action of the consumer, the action monitoring processing unit 65 always outputs the hand stretching notification command to the integration processing unit 67. Therefore, the operation of the integration processing unit 67, to which the hand stretching notification command is input, is described with reference to FIG. 14.

In ACT 521, the integration processing unit 67 acquires action position information from the hand stretching notification command. In ACT 522, the integration processing unit 67 stores the action position information. A storage destination of the action position information is, for example, the main memory 602. The storage destination of the action position information may be the auxiliary storage device 603.

In ACT 523, the integration processing unit 67 determines whether the decrease notification command is input. If the decrease notification command is not input, the integration processing unit 67 determines NO in ACT 523 and the process proceeds to ACT 524. In ACT 524, the integration processing unit 67 determines whether the increase notification command is input. If the increase notification command is not input, the integration processing unit 67 determines NO in ACT 524 and the process proceeds to ACT 525. In ACT 525, the integration processing unit 67 determines whether the hand return notification command is input. If the hand return notification command is not input, the process returns to ACT 523. The integration processing unit 67 waits for the decrease notification command to be input, the increase notification command to be input, and the hand return notification command to be input in ACT 523 to ACT 525.

In the waiting state in ACT 523 to ACT 525, if the hand return notification command is input, the integration processing unit 67 determines YES in ACT 525 and the process proceeds to ACT 526. In ACT 526, the integration processing unit 67 clears the action position information. Accordingly, the integration processing unit 67 ends the operation of the procedure illustrated in the flowchart of FIG. 14.

As described above, the integration processing unit does not execute particular processing if the hand stretching notification command is input but the decrease notification command or the increase notification command is not input and the hand return notification command is input. That is, the integration processing unit 67 does not execute particular processing if the consumer SA, who performs the purchasing action, retracts a hand without picking up a commodity or if the consumer SA, who performs the commodity returning action, retracts a hand without returning a commodity.

In the waiting state in ACT 523 to ACT 525, if the decrease notification command is input, the integration processing unit 67 determines YES in ACT 523 and the process proceeds to ACT 527. In ACT 527, the integration processing unit 67 determines whether the increase notification command is input. If the increase notification command is not input, the integration processing unit 67 determines NO in ACT 527 and the process proceeds to ACT 528. In ACT 528, the integration processing unit 67 determines whether the hand return notification command is input. If the hand return notification command is not input, the integration processing unit 67 determines NO in ACT 528 and the process returns to ACT 527. In ACT 527 and ACT 528, the integration processing unit 67 waits for the increase notification command to be input or the hand return notification command to be input.

In the waiting state in ACT 527 and ACT 528, if the increase notification command is input, the integration processing unit 67 determines YES in ACT 527 and the process returns to ACT 523. That is, the integration processing unit 67 returns to the waiting state in ACT 523 to ACT 525.

In the waiting state in ACT 527 and the ACT 528, if the hand return notification command is input, the integration processing unit 67 determines YES in ACT 528 and the process proceeds to ACT 529. In ACT 529, the integration processing unit 67 executes purchase processing. Details of the purchase processing are described below. If ending the purchase processing, the integration processing unit 67 ends the operation of the procedure illustrated in the flowchart of FIG. 14.

As described above, after the hand stretching notification command is input, if the decrease notification command is input and the hand return notification command is subsequently input, the integration processing unit 67 executes the purchase processing. That is, if the consumer SA performs a purchasing action, the integration processing unit 67 executes the purchase processing. After the hand stretching notification command is input, if the decrease notification command is input and the increase notification command is further input and thereafter the hand return notification command is input, the integration processing unit 67 does not execute particular processing. That is, if the consumer SA immediately returns a commodity, which the consumer SA once holds, and retracts a hand, the integration processing unit 67 does not execute particular processing.

In the waiting state in ACT 523 to ACT 525, if the increase notification command is input, the integration processing unit 67 determines YES in ACT 524 and the process proceeds to ACT 530. In ACT 530, the integration processing unit 67 waits for the hand return notification command. If the hand return notification command is input, the integration processing unit 67 determines YES in ACT 530 and the process proceeds to ACT 531. In ACT 531, the integration processing unit 67 executes commodity return processing. Details of the commodity return processing are described below. If ending the commodity return processing, the integration processing unit 67 ends the operation of the procedure illustrated in the flowchart of FIG. 14.

As described above, after the hand stretching notification command is input, if the increase notification command is input and the hand return notification command is subsequently input, the integration processing unit 67 executes the commodity return processing. That is, if the consumer SA performs a commodity returning action, the integration processing unit 67 executes the commodity return processing.

Figure 15:
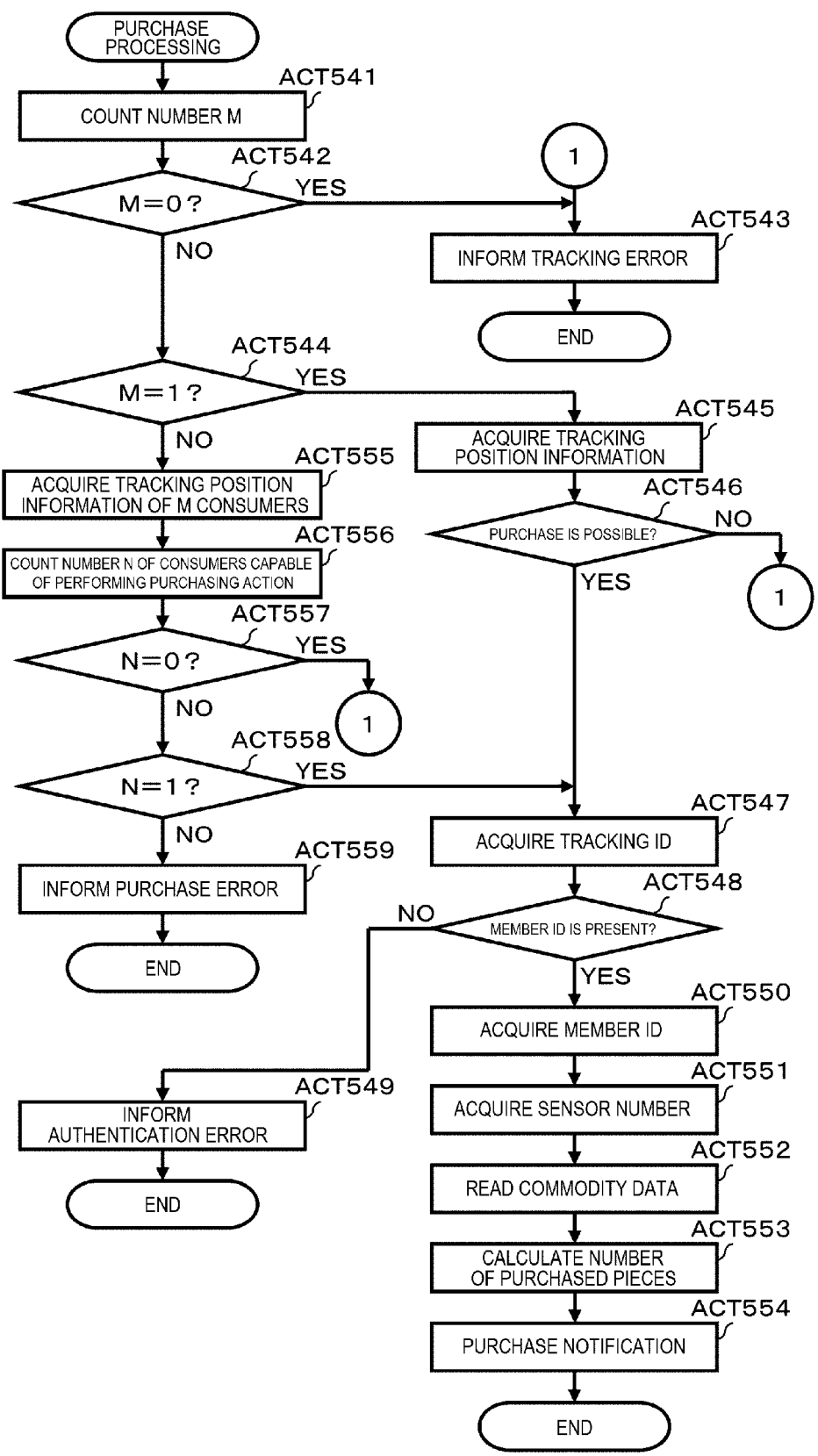
FIG. 15 is a flowchart illustrating a procedure of purchase processing in FIG. 14.

FIG. 15 is a flowchart illustrating aspects of the purchase processing. If starting the purchase processing, in ACT 541, the integration processing unit 67 counts the number M of consumers present in the purchase region 112. Specifically, the integration processing unit 67 counts the number of tracking files 68 in which tracking position information of traffic line data corresponding to the present time coincides with purchase position information for the purchase region 112 among the tracking files 68 stored in the tracking processing unit 62. The number of the tracking files 68 is the number M of consumers present in the purchase region 112. The purchase position information is an aggregate of X-Y plane coordinates in the purchase region 112. The purchase position information for the purchase region 112 is set in the auxiliary storage device 603 in advance.

In ACT 542, the integration processing unit 67 determines whether the number M of consumers present in the purchasing region 112 is zero. If the number M is zero, it is likely that a consumer who cannot be tracked by the tracking processing unit 62 took out a commodity from the shelf 10. In this case, the integration processing unit 67 determines YES in ACT 542 and the process proceeds to ACT 543. In ACT 543, the integration processing unit 67 outputs sound data of a tracking error to the sound synthesizing unit 66. Consequently, the sound synthesizing unit 66 synthesizes sound indicating the tracking error. Sound such as "Since an error has occurred, you cannot do shopping" is output from the speaker 5. Accordingly, the integration processing unit 67 ends the purchase processing.

If the number M of consumers present in the purchase region 112 is not zero, the integration processing unit 67 determines NO in ACT 542 and the process proceeds to ACT 544. In ACT 544, the integration processing unit 67 determines whether the number M of consumers present in the purchase region 112 is one. If there is only one tracking file 68 in which the tracking position information of the traffic line data corresponding to the present time coincides with the purchase position information, the number M is one. In the following explanation, the tracking file 68 is referred to as target tracking file 68. For example, if only one consumer SA is present in the purchase region 112, the tracking file 680 is the target tracking file 680.

If the number M of consumers present in the purchase region 112 is one, the integration processing unit 67 determines YES in ACT 544 and the process proceeds to ACT 545. In ACT 545, the integration processing unit 67 acquires the tracking position information of the traffic line data corresponding to the present time from the target tracking file 680.

Figure 14:
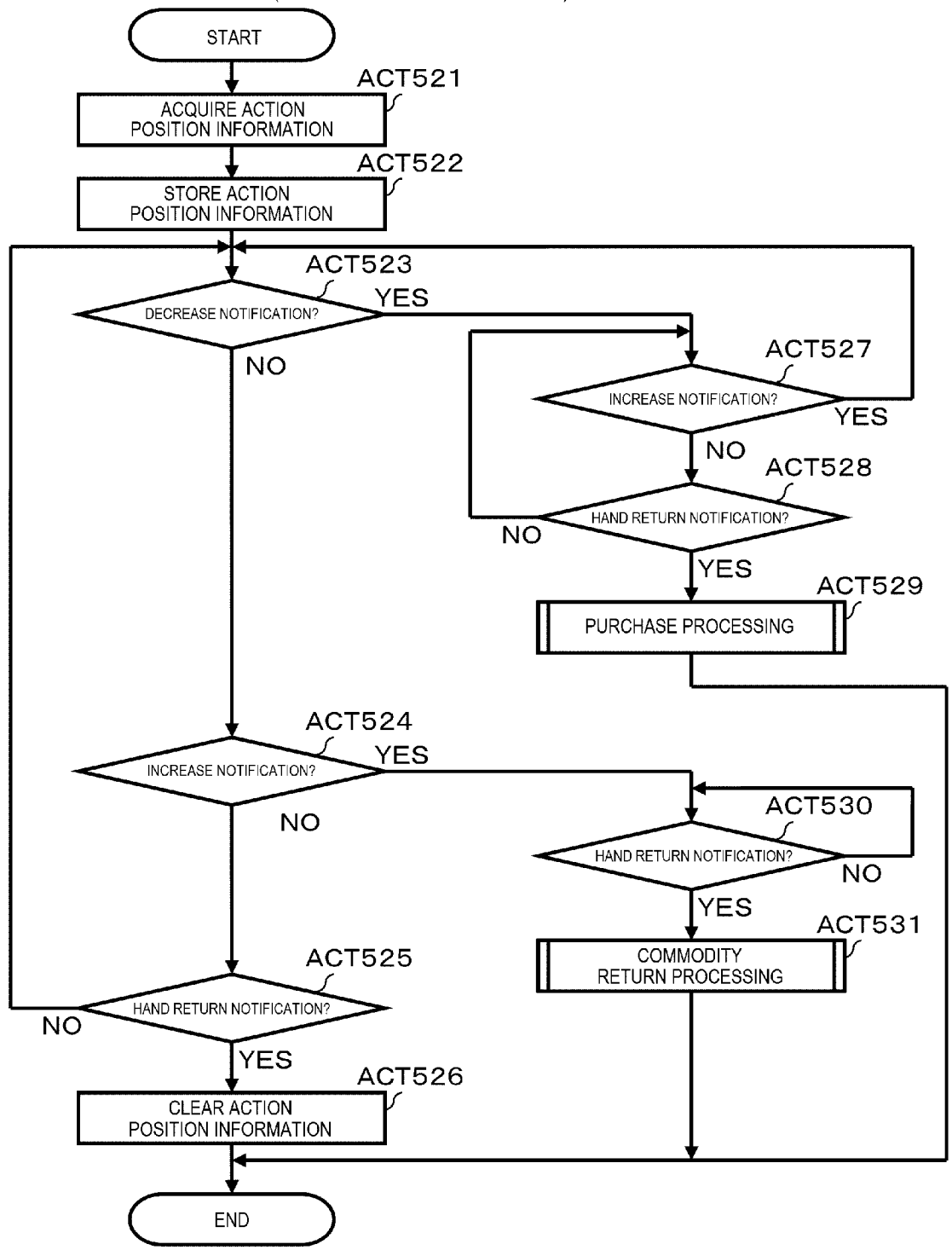
FIG. 14 is a flowchart illustrating an operation procedure of the integration processing unit to which a hand stretching notification command is input.

In ACT 546, the integration processing unit 67 determines, based on the tracking position information and the action position information stored in the processing in ACT 522 in FIG. 14, whether a purchasing action by the consumer SA tracked by a tracking ID stored in the target tracking file 680 is possible. Specifically, the integration processing unit 67 determines whether an act of the consumer SA present in a place specified by the tracking position information stretching a hand and taking out a commodity from a place specified by the action position information is possible. If the act of taking out a commodity cannot be performed, the integration processing unit 67 determines that the purchasing action cannot be performed. The integration processing unit 67 determines NO in ACT 546 and the process proceeds to ACT 543. In ACT 543, the integration processing unit 67 outputs sound data of a tracking error to the sound synthesizing unit 66. Accordingly, the integration processing unit 67 ends the purchase processing.

If the purchasing action is possible, the integration processing unit 67 determines YES in ACT 546 and the process proceeds to ACT 547. In ACT 547, the integration processing unit 67 acquires the tracking ID from the target tracking file 680.

Subsequently, in ACT 548, the integration processing unit 67 searches through the correlation table 69 and determines whether the tracking ID is correlated with a member ID. If the tracking ID is not correlated with a member ID, it is assumed that a consumer whose member ID is not approved performed the purchasing action. In this case, the integration processing unit 67 determines NO in ACT 548 and the process proceeds to ACT 549. In ACT 549, the integration processing unit 67 outputs sound data of an authentication error to the sound synthesizing unit 66. Consequently, the sound synthesizing unit 66 synthesizes sound indicating the authentication error. Sound such as "The member ID is not authenticated" is output from the speaker 5. Accordingly, the integration processing unit 67 ends the purchase processing.

If a member ID is correlated with the tracking ID, the integration processing unit 67 determines YES in ACT 548 and the process proceeds to ACT 550. In ACT 550, the integration processing unit 67 acquires the member ID correlated with the tracking ID. In ACT 551, the integration processing unit 67 acquires the sensor number from the decrease notification command. The decrease notification command is the decrease notification command received from the commodity monitoring sensor 1 in ACT 523 in FIG. 14.

In ACT 552, the integration processing unit 67 reads, from the commodity data file 61, commodity data including a commodity code, a commodity name, and a unit weight stored together with the sensor number. Further, in ACT 553, the integration processing unit 67 calculates the number of purchased pieces. Specifically, the integration processing unit 67 acquires a weight change amount from the decrease notification command. The integration processing unit 67 divides the weight change amount by the unit weight. As a result, the integration processing unit 67 calculates the number of purchased pieces by, if a value of the first decimal place is "1", rounding off the value and, if the value of the first decimal place is "9", rounding up the value.

If the value of the first decimal place is "2" to "8", the number of purchased pieces is regarded as being unable to be calculated. Concerning this point, the integration processing unit 67 may calculate the number of purchased pieces by, if the value of the first decimal place is "1" or "2", rounding off the value and, if the value of the first decimal place is "8" or "9", rounding up the value. Alternatively, if the weight change amount cannot be divided by the unit weight, the number of purchased pieces may be regarded as being unable to be calculated. Usually, commodities are correctly displayed in the sections of the shelf 10. Therefore, since the weight change amount can be divided by the unit weight, the number of purchased pieces is not unable to be calculated.

In ACT 554, the integration processing unit 67 outputs a purchase notification command to the purchase management device 7. The purchase notification command includes the member ID acquired in the processing in ACT 550, the commodity code of the commodity data, the commodity name, and the unit weight read in the processing in ACT 552, and the number of purchased pieces calculated in ACT 553. Accordingly, the integration processing unit 67 ends the purchase processing.

On the other hand, if two or more target tracking file 68 are present, that is, if the number M of consumers present in the purchase region 112 is two or more, the integration processing unit 67 determines NO in ACT 544 and the process proceeds to ACT 555. In ACT 555, the integration processing unit 67 acquires the tracking position information of the traffic line data corresponding to the present time from the tracking files 68 of the consumers.

In ACT 556, the integration processing unit 67 counts, based on the tracking position information acquired from the target tracking file 68 and the action position information stored in the processing in ACT 522 in FIG. 14, the number N of consumers capable of performing a purchasing action. Specifically, the integration processing unit 67 determines, for each of the tracking files 68, whether an action of a consumer present in a place specified by the tracking position information stretching a hand and taking out a commodity from a place specified by the action position information is possible. The integration processing unit 67 counts, as the number N of consumers capable of performing the purchasing action, the number of the tracking files 68 for which it is determined that the action of taking out a commodity is possible.

In ACT 557, the integration processing unit 67 determines whether the number N of consumers capable of performing the purchasing action is zero. If the number N is zero, the integration processing unit 67 determines YES in ACT 557 and the process proceeds to ACT 543. The integration processing unit 67 executes the processing in ACT 543 in the same manner as described above. Accordingly, the integration processing unit 67 ends the purchase processing.

If the number N of consumers capable of performing the purchasing action is not zero, the integration processing unit 67 determines NO in ACT 557 and the process proceeds to ACT 558. In ACT 558, the integration processing unit 67 determines whether the number N of consumers capable of performing the purchasing action is one. If the number N is one, it can be specified that the one consumer performed the purchasing action. The integration processing unit 67 determines YES in ACT 558 and the process proceeds to ACT 547. The integration processing unit 67 executes the processing in ACT 547 to ACT 554 in the same manner as described above. Accordingly, the integration processing unit 67 ends the purchase processing.

If the number N of consumers capable of performing the purchasing action is two or more, a purchaser cannot be specified. The integration processing unit 67 determines NO in ACT 558 and the process proceeds to ACT 559. In ACT 559, the integration processing unit 67 outputs sound data of a purchase error to the sound synthesizing unit 66. Consequently, the sound synthesizing unit 66 synthesizes sound indicating the purchase error. Sound such as "Since a purchaser cannot be specified, an error has occurred" is output from the speaker 5. Accordingly, the integration processing unit 67 ends the purchase processing.

As described above, the integration processing unit 67 executes the purchase processing on the purchasing action of the consumer to thereby specify one consumer present in the purchase region 112 as a purchaser of a commodity taken out from the shelf 10. The integration processing unit 67 transmits a purchase notification command including a member ID of the consumer specified as the purchaser and data of the purchased commodity to the sales management device 7.

Therefore, the operation of the sales management device 7, which receives the purchase notification command, is described with reference to FIG. 19.

In ACT 701, the sales management device 7 acquires the member ID from the purchase notification command. In ACT 702, the sales management device 7 creates purchased commodity data based on data of a commodity, that is, a commodity code, a commodity name, a unit price, and the number of purchased pieces included in the purchase notification command. In ACT 703, the purchase management device 7 adds the purchased commodity data to the purchase list 71 in which the member ID acquired in the processing in ACT 701 is set. Accordingly, the sales management device 7 ends the operation of the procedure illustrated in the flowchart of FIG. 19.

As described above, every time the sales management device 7 receives a purchase notification command from the integration processing unit 67, the sales management device 7 adds purchase commodity data to the purchase list 71 in which a member ID included in the purchase notification command is included.

Figure 16:
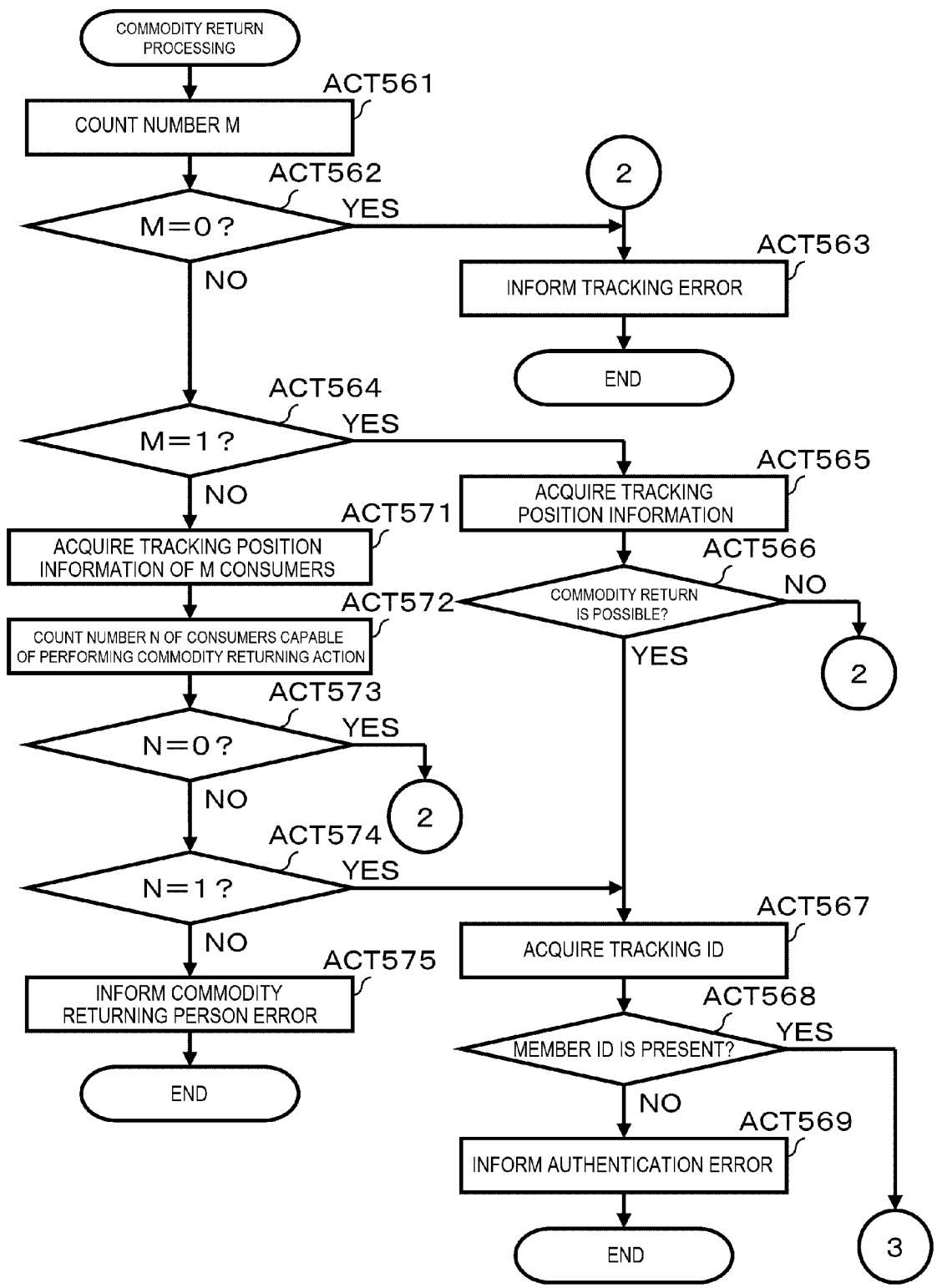
FIG. 16 is a flowchart illustrating a procedure of commodity return processing in FIG. 14.
Figure 17:
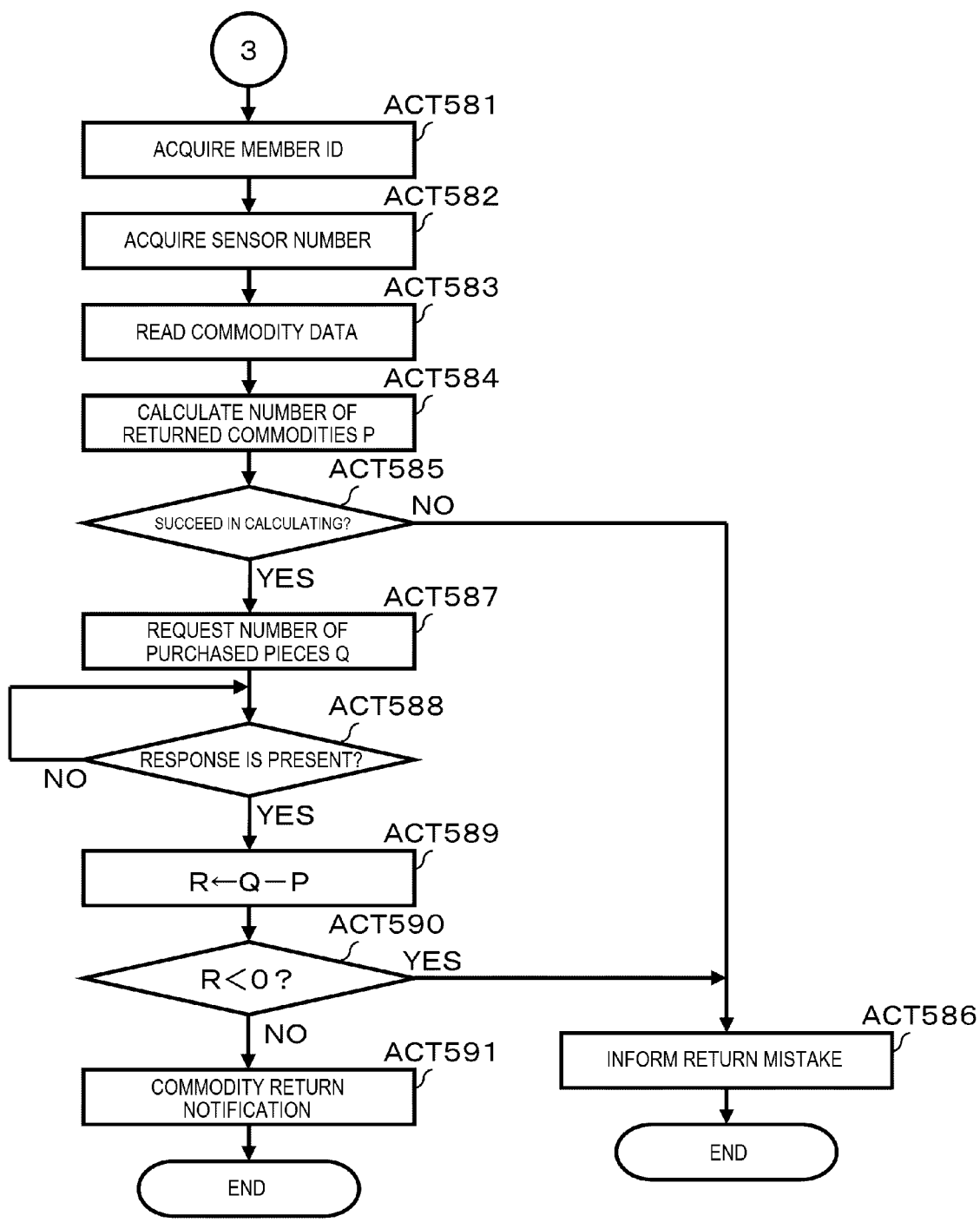
FIG. 17 is a flowchart illustrating the procedure of the commodity return processing in FIG. 14.

FIGS. 16 and 17 are flowcharts illustrating aspects of commodity return processing. When starting the commodity return processing, in ACT 561, the integration processing unit 67 counts the number M of consumers present in the purchase region 112. The integration processing unit 67 counts the number M of consumers present in the purchase region 112 as in the processing in ACT 541 of the purchase processing.

In ACT 562, the integration processing unit 67 determines whether the number M of consumers present in the purchase region 112 is zero. If the number M is zero, the integration processing unit 67 determines YES in ACT 562 and the process proceeds to ACT 563. In ACT 563, the integration processing unit 67 outputs sound data of a tracking error to the sound synthesizing unit 66. Consequently, the sound synthesizing unit 66 synthesizes sound indicating the tracking error. Sound such as "Since an error has occurred, you cannot do shopping" is output from the speaker 5. Accordingly, the integration processing unit 67 ends the commodity return processing.

If the number M of consumers present in the purchase region 112 is not zero, the integration processing unit 67 determines NO in ACT 562 and the process proceeds to ACT 564. In ACT 564, the integration processing unit 67 determines whether the number M of consumers present in the purchase region 112 is one.

If the number M of consumers present in the purchase region 112 is one, the integration processing unit 67 determines YES in ACT 564 and the process proceeds to ACT 565. In ACT 565, the integration processing unit 67 acquires the tracking position information of the traffic line data corresponding to the present time from the target tracking file 68. In ACT 566, the integration processing unit 67 determines, based on the tracking position information and the action position information stored in the processing in ACT 522 in FIG. 14, whether a commodity returning action by a consumer tracked by the tracking ID described in the target tracking file 68 is possible. Specifically, the integration processing unit 67 determines whether an act of a consumer present in a place specified by the tracking position information stretching a hand and returning a commodity from a place specified by the action position information is possible. If the act of returning the commodity cannot be performed, the integration processing unit 67 determines that the commodity returning action cannot be performed. In that case, the integration processing unit 67 determines NO in ACT 566 and the process proceeds to ACT 563. In ACT 563, the integration processing unit 67 outputs sound data of a tracking error to the sound synthesizing unit 66. Accordingly, the integration processing unit 67 ends the commodity return processing.

If the commodity returning action is possible, the integration processing unit 67 determines YES in ACT 566 and the process proceeds to ACT 567. In ACT 567, the integration processing unit 67 acquires the tracking ID from the target tracking file 68. In ACT 568, the integration processing unit 67 searches through the correlation table 69 and determines whether the tracking ID is correlated with a member ID. If the tracking ID is not correlated with the member ID, in ACT 569, the integration processing unit 67 outputs sound data of an authentication error to the sound synthesizing unit 66. Consequently, the sound synthesizing unit 66 synthesizes sound indicating the authentication error. Sound such as "The member ID is not authenticated" is output from the speaker 5. Accordingly, the integration processing unit 67 ends the commodity return processing.

If a member ID is correlated with the tracking ID, the integration processing unit 67 determines YES in ACT 568 and the process proceeds to ACT 581 in FIG. 17. In ACT 581, the integration processing unit 67 acquires the member ID correlated with the tracking ID. In ACT 582, the integration processing unit 67 acquires the sensor number from the increase notification command. The increase notification command is the increase notification command received from the commodity monitoring sensor 1 in ACT 524 in FIG. 14.

In ACT 583, the integration processing unit 67 reads, from the commodity data file 61, commodity data including a commodity code, a commodity name, and a unit weight stored together with the sensor number. Further, in ACT 584, the integration processing unit 67 calculates the number of returned pieces P. Specifically, the integration processing unit 67 acquires a weight change amount from the increase notification command. The integration processing unit 67 divides the weight change amount by the unit weight. As a result, the integration processing unit 67 calculates the number of returned pieces P by, if a value of the first decimal place is "1", rounding off the value and, if the value of the first decimal place is "9", rounding up the value.

If the value of the first decimal place is "2" to "8", the number of returned pieces P is regarded as being unable to be calculated. Concerning this point, the integration processing unit 67 may calculate the number of returned pieces P by, if the value of the first decimal place is "1" or "2", rounding off the value and, if the value of the first decimal place is "8" or "9", rounding up the value. Alternatively, if the weight change amount cannot be divided by the unit weight, the number of returned pieces P may be regarded as being unable to be calculated.

In ACT 585, the integration processing unit 67 determines whether the integration processing unit 67 succeeds in calculating the number of returned pieces P. If the integration processing unit 67 fails in calculating the number of returned pieces P, a consumer is considered to return a commodity to a section of another commodity having a different unit weight. For example, as illustrated in FIG. 4, if the consumer returns the commodity A having a unit weight of 500 grams to the section 203 where the commodity C is displayed, since a unit weight of the commodity C is 600 grams, a quotient is 0.83. Similarly, if the consumer returns the commodity A to the section 205 where the commodity E is displayed, since a unit weight of the commodity E is 800 grams, a quotient is 0.625. Therefore, in both the cases, the number of returned pieces P cannot be calculated.

If failing in calculating the number of returned pieces P, the integration processing unit 67 determines NO in ACT 585 and the process proceeds to ACT 586. In ACT 586, the integration processing unit 67 outputs sound data of a return mistake error to the sound synthesizing unit 66. Consequently, the sound synthesizing unit 66 synthesizes sound indicating the return mistake error. Sound such as "The commodity is returned to a wrong place" is output from the speaker 5. Accordingly, the integration processing unit 67 ends the commodity return processing.

If succeeding in calculating the number of returned pieces P, the integration processing unit 67 determines YES in ACT 585 and the process proceeds to ACT 587. In ACT 587, the integration processing unit 67 outputs a number of purchased pieces request command to the sales management device 7. The number of purchased pieces request command includes the member ID acquired in the processing in ACT 581 and the commodity code of the commodity data acquired in the processing in ACT 583.

The sales management device 7, which receives the number of purchased pieces request command, detects, from the purchase list 71 in which the member ID is set, the number of purchased pieces Q correlated with the commodity code and stored and responds to the integration processing unit 67. At this time, if data of the commodity code is not stored in the purchase list 71, the purchase management device 7 returns "0" as the number of purchased pieces Q.

In ACT 588, the integration processing unit 67, which outputs the number of purchased pieces request command, waits for the number of purchased pieces Q to be returned. If the number of purchased pieces Q is returned, in ACT 589, the integration processing unit 67 subtracts the number of returned pieces P from the number of purchased pieces Q and calculates a difference value R. In ACT 590, the integration processing unit 67 determines whether the difference value R is negative.

For example, it is assumed that the consumer SA takes out the commodity A from the shelf 10 but does not take out the commodity B. In this case, in the purchase list 711 of the consumer SA, data (the number of purchased pieces=1) of the commodity A is stored but data of the commodity B is not stored. It is assumed that the consumer SA returns the commodity A to the section 202 of the commodity B by mistake. Then, since the unit weights of the commodity A and the commodity B are equal, the number of returned pieces P is calculated as "1". However, since data of the commodity B is not stored in the purchase list 711, the number of purchased pieces Q is "0". Therefore, the difference value R is "−1". If the consumer SA returns the commodity A to the section 201, since the number of purchased pieces Q is "−1", the difference value R is "0".

If the difference value R is negative, the integration processing unit 67 determines YES in ACT 590 and the process proceeds to ACT 586. The integration processing unit 67 outputs sound data of a return mistake error to the sound synthesizing unit 66. Accordingly, the integration processing unit 67 ends the commodity return processing.

If the difference value R is "0" or "1" or more, the integration processing unit 67 determines NO in ACT 590 and the process proceeds to ACT 591. In ACT 591, the integration processing unit 67 outputs a commodity return notification command to the sales management device 7. The commodity return notification command includes the member ID acquired in the processing in ACT 581, the commodity code, the commodity name, and the unit weight of the commodity data read in the processing in ACT 583, and the number of returned pieces P calculated in the processing in ACT 584. Accordingly, the integration processing unit 67 ends the commodity return processing.

Referring back to FIG. 16, if the number M of consumers present in the purchase region 112 is two or more, the integration processing unit 67 determines NO in ACT 564 and the process proceeds to ACT 571. In ACT 571, the integration processing unit 67 acquires the tracking position information of the traffic line data corresponding to the present time from all the target tracking files 68. In ACT 572, the integration processing unit 67 counts, based on the tracking position information acquired from the target tracking files 68 and the action position information stored in ACT 522 in FIG. 14, the number N of consumers capable of performing the commodity returning action.

In ACT 573, the integration processing unit 67 determines whether the number N of consumers capable of performing the commodity returning action is 0. If the number N is zero, the integration processing unit 67 determines YES in ACT 573 and the process proceeds to ACT 563. In ACT 563, the integration processing unit 67 outputs sound data of a tracking error to the sound synthesizing unit 66. Accordingly, the integration processing unit 67 ends the commodity return processing.

If the number N of consumers capable of performing the commodity returning action is not zero, the integration processing unit 67 determines NO in ACT 573 and the process proceeds to ACT 574. In ACT 574, the integration processing unit 67 determines whether the number N of consumers capable of performing the commodity returning action is one. If the number N is one, the one consumer can be specified as a commodity returning person. The integration processing unit 67 determines YES in ACT 574 and the process proceeds to ACT 567. The integration processing unit 67 executes the processing in ACT 567 to ACT 569 and ACT 581 to ACT 591 in the same manner as described above.

If the number N of consumers capable of performing the commodity returning action is two or more, a commodity returning person cannot be specified. The integration processing unit 67 determines NO in ACT 574 and the process proceeds to ACT 575. In ACT 575, the integration processing unit 67 outputs sound data of a commodity returning person error to the sound synthesizing unit 66. Consequently, the sound synthesizing unit 66 synthesizes sound indicating the commodity returning person error. Sound such as "A commodity returning person is not successfully specified" is output from the speaker 5. Accordingly, the integration processing unit 67 ends the commodity return processing.

As described above, the integration processing unit 67 executes the commodity return processing on the commodity returning action of consumers to thereby specify one consumer present in the purchase region 112 as a commodity returning person who returns a commodity to the shelf 10. The integration processing unit 67 determines whether the consumer specified as the commodity returning person purchased the commodity returned to the shelf 10, that is, a returned commodity. If the consumer purchased the returned commodity, that is, if the difference value R obtained by subtracting the number of returned pieces P from the number of purchased pieces Q is 0 or more, the integration processing unit 67 transmits a commodity return notification command including a member ID of the consumer specified as the commodity returning person and data of the returned commodity to the sales management device 7.

On the other hand, if the consumer did not purchase the returned commodity, that is, the difference value R obtained by subtracting the number of returned pieces P from the number of purchased pieces Q is negative, the integration processing unit 67 informs a return mistake error.

Figure 20:
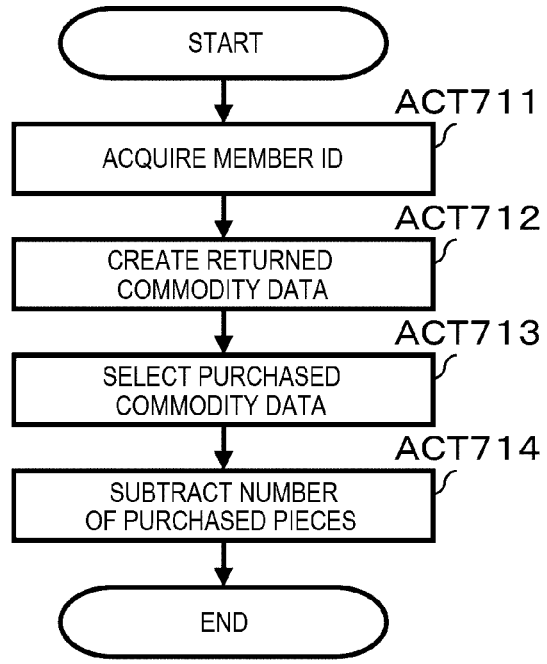
FIG. 20 is a flowchart illustrating an operation procedure of the sales management device to which a commodity return notification command is input.

The operation of the sales management device 7, which receives the commodity return notification command, is described with reference to FIG. 20. In ACT 711, the sales management device 7 acquires the member ID from the commodity return notification command. In ACT 712, the sales management device 7 creates returned commodity data based on the data of the commodity included in the commodity return notification command, that is, the commodity code, the commodity name, the unit weight, and the number of returned pieces P. The returned commodity data is data in which the number of purchased pieces of the purchased commodity data is replaced with the number of returned pieces P.

In ACT 713, the sales management device 7 selects, from the purchase list 71 in which the member ID acquired in the processing in ACT 701 is set, purchased commodity data in which the returned commodity data and the commodity code coincide. In ACT 714, the sales management device 7 subtracts the number of returned pieces P of the returned commodity data from the number of purchased pieces of the selected purchased commodity data. Accordingly, the sales management device 7 ends the operation of the procedure illustrated in the flowchart of FIG. 20.

As described above, if receiving the commodity return notification command from the integration processing unit 67, the sales management device 7 reduces, by the number of returned pieces P, the number of purchased pieces of the purchased commodity data relating to the returned commodity of the purchase list 71 in which the member ID included in the commodity return notification command is set.

If the commodity retuning action of a commodity is recognized and a consumer who performed the commodity return action is specified, the integration processing unit 67 outputs, to the sales management device 7, the commodity return notification command for reducing data of the commodity from the purchase list 71 of the consumer. However, if the data of the purchase list 71 has an abnormal value because the data of the commodity is reduced from the purchase list 71, the integration processing unit 67 does not output the commodity return notification command. The integration processing unit 67 executes abnormal time processing.

Specifically, if the difference value R between the number of purchased pieces Q and the number of returned pieces P is negative, that is, the number of purchased pieces after the subtraction of the number of returned pieces P is negative, the data of the purchase list 71 has an abnormal value. If determining YES in ACT 590, the integration processing unit 67 executes the processing in ACT 586. That is, the integration processing unit 67 executes, as the abnormal time processing, processing for informing a mistake of a commodity return place.

The operation of the integration processing unit 67, to which the exist notification command is input, is described with reference to a flowchart of FIG. 18.

In ACT 601, the integration processing unit 67 acquires the tracking ID from the exit notification command. In ACT 602, the integration processing unit 67 searches through the correlation table 69 and determines whether a member ID is correlated with the tracking ID. If a member ID is not correlated, a consumer managed by the tracking ID is a consumer who exited the store without performing personal authentication. Therefore, the integration processing unit 67 determines NO in ACT 602 and ends the processing.

If a member ID is correlated with the tracking ID, the integration processing unit 67 determines YES in ACT 602 and the process proceeds to ACT 603. In ACT 603, the integration processing unit 67 acquires the member ID correlated with the tracking ID. In ACT 604, the integration processing unit 67 outputs the settlement permission notification command to the sales management device 7. The settlement permission notification command includes the member ID acquired in the processing in ACT 603. Accordingly, the integration processing unit 67 ends the operation of the procedure illustrated in the flowchart of FIG. 18.

As described above, if the exit notification command is input, the integration processing unit 67 determines that a settlement instruction is performed. The integration processing unit 67 outputs the settlement permission notification to the sales management device 7.

Figure 21:
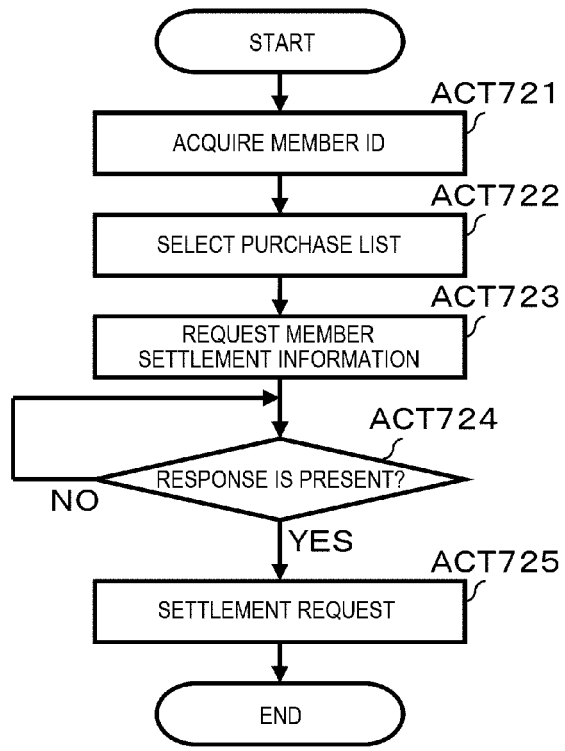
FIG. 21 is a flowchart illustrating an operation procedure of the sales management device to which a settlement permission notification command is input.

FIG. 21 is a flowchart illustrating the operation of the sales management device 7 that receives the settlement permission notification command. In ACT 721, the sales management device 7 acquires the member ID from the settlement permission notification command. In ACT 722, the sales management device 7 selects the purchase list 71 in which the member ID is set. In ACT 723, the sales management device 7 requests the member server 8 to transmit information relating to settlement registered by a consumer identified by the member ID.

In response to the request, the member server 8 searches through the member database 81, acquires information relating to settlement registered by the consumer, and outputs the information to the sales management device 7.

In ACT 724, the sales management device 7 waits for the information relating to the settlement to be output to the sales management device 7. If the information relating to the settlement is transmitted from the member server 8, the sales management device 7 determines YES in ACT 724 and the process proceeds to ACT 725. In ACT 725, the sales management device 7 outputs the purchased commodity data registered in the purchase list 71 to the settlement server 9 together with the information relating to the settlement and requests settlement. In response to the request, the settlement server 9 executes settlement processing. For example, if the information relating to the settlement is information relating to card settlement by a credit card, settlement processing for the credit card is executed. For example, if the information relating to the settlement is information necessary for electronic settlement in which a barcode, a two-dimensional code, or the like is used, settlement processing by electronic settlement is executed. Accordingly, the sales management device 7 ends the processing for the settlement permission notification command.

The operation of the store system 100 is as described above.

As described above, the shelf control device 6 having the functions of the tracking processing unit 62, the personal authentication processing unit 63, and the integration processing unit 67 configure a customer authentication system including an authenticating unit, a tracking unit, an acquiring unit, and a control unit. With such a customer authentication system, personal authentication using the personal authentication device 41 or 42 is allowed if the number of consumers to be set as targets of authentication is one. However, the personal authentication is not allowed if the number of consumers set as targets of authentication is plural. Therefore, it is possible to prevent a deficiency in which a consumer actually succeeded in authentication and a consumer specified as succeeded in authentication are different because a plurality of consumers are present near the personal authentication device 41 or 42.

If the personal authentication is not allowed because the number of consumers set as targets of authentication is plural, the customer authentication system notifies a consumer to perform the authentication again after the consumer becomes alone. Therefore, a consumer whose authentication results in an error because a plurality of consumers are present near the personal authentication device 41 or 42 only has to perform the authentication again after the other consumers exit the authentication region 113 or the authentication region 114. As a result, it does not occur that authentication results in an error even if the authentication is performed many times if the other consumers are present in the authentication region 113 or the authentication region 114. Therefore, there is an effect that it is possible to reduce the number of times of occurrence of an error.

The customer authentication system does not instruct a consumer whose authentication results in an error because of a reason such as a wrong member ID to perform the authentication again. Therefore, it is possible to prevent a situation in which the consumer having the wrong member ID perform authentication operation many times and the number of times error occurrence increases.

If the customer authentication system does not allow authentication because a plurality of persons are present in any one authentication region, the customer authentication system suggests authentication in another authentication region where no person is present. Therefore, a consumer whose authentication results in an error because the number of consumers set as targets of authentication is plural can succeed in the authentication at a high probability by moving to another authentication region and performing the authentication.

If authentication is successful, the customer authentication system correlates a member ID of a consumer who succeeds in the authentication and a tracking ID allocated to the consumer. Conversely, as long as the authentication is unsuccessful, the member ID of the consumer is not correlated with the tracking ID. The shelf control device 6 does not allow a purchasing action and a commodity returning action of a consumer tracked by a tracking ID not correlated with a member ID. Therefore, data of the purchase list 71 is extremely highly reliable.

Modifications of the above are described below.

In the above, as an illustration, the personal authentication devices 41 and 42 are attached to both the sides of the shelf 10. Concerning this point, the personal authentication device 41 or the personal authentication device 42 may be attached to one side of the shelf 10. The personal authentication device 41 or the personal authentication device 42 may be attached to each of a plurality of shelves 10.

Figure 22:
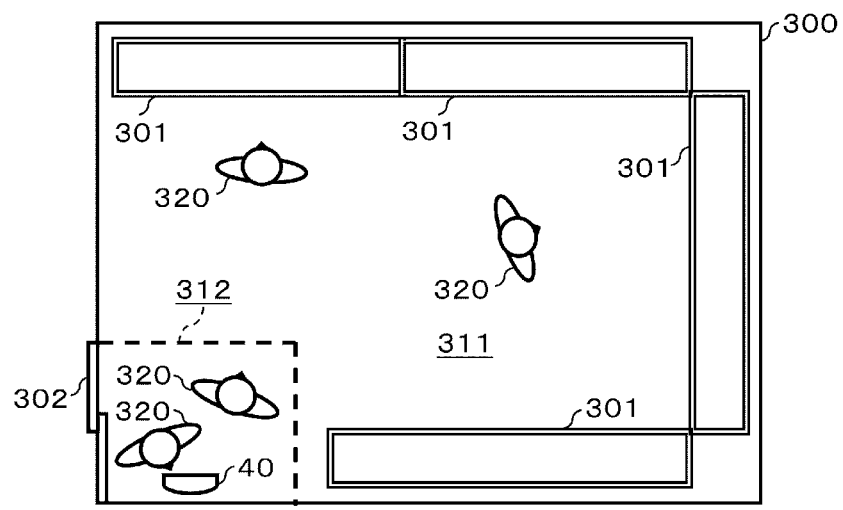
FIG. 22 is a schematic diagram illustrating a layout of a store according to another embodiment.

Alternatively, as illustrated in FIG. 22, a personal authentication device 40 may be provided in a place unrelated to shelfs 301. FIG. 22 is an example in which the personal authentication device 40 is set near an entrance 302 of a store 300. In this example, an authentication region 312 for the personal authentication device 40 is set in a part of a tracking region 311 for tracking a consumer 320. The authentication device performs control to allow authentication by the personal authentication device 40 if one consumer is present in the authentication region 312 but not to allow authentication if a plurality of consumers are present in the authentication region 312.

In the above embodiment, the re-authentication instruction or the proposal of another authentication place is performed on the display device of the personal authentication device 41 or the personal authentication device 42. Concerning this point, the re-authentication instruction or the proposal of another authentication place may be performed by sound from a speaker of the personal authentication device 41 or the personal authentication device 42. The re-authentication instruction or the proposal of another authentication place may be performed by a device provided separately from the personal authentication device 41 or the personal authentication device 42.

In this embodiment, the customer authentication system outputs the error response command of the first proximity error if another authentication place is not vacant and outputs the error response command of the second proximity error if the other authentication place is vacant. Concerning this point, the customer authentication system may output the error response command of the first proximity error irrespective of whether the other authentication place is vacant.

The tracking processing unit 62 analyzes the image data received from the tracking sensors 21 and 22 and tracks the traffic line of the consumer present in the tracking region 111. The tracking processing unit 62 may track the traffic line of the consumer according to information from a receiver that receives a beacon transmitted from a transmitter carried by the consumer.

The personal authentication processing unit 63 may authenticate the consumer with biological authentication. In this case, the personal authentication devices 41 and 42 are devices that read biological information such as a face, an iris, and a fingerprint.

The commodity monitoring processing unit 64 may monitor movement of a commodity from an image photographed by a camera. In this case, it is possible to detect, according to similarity of the image of the commodity photographed by the camera and a preset image of the commodity, that the commodity is returned to a wrong place.

The commodity monitoring sensor 1 may be a sensor that detects an increase or a decrease in the quantity of displayed commodities. In this case, if quantity data from the commodity monitoring sensor 1 decreases, the commodity monitoring processing unit 64 recognizes that a commodity is taken out from the section where the commodity monitoring sensor 1 is provided. If the quantity data from the commodity monitoring sensor 1 increases, the commodity monitoring processing unit 64 recognizes that a commodity is placed in the section where the commodity monitoring sensor 1 is provided.

An image processing unit may be adopted instead of the sound synthesizing unit 66 to perform notification with image display. Alternatively, the notification may be performed by using both of sound and an image.

Figure 19:
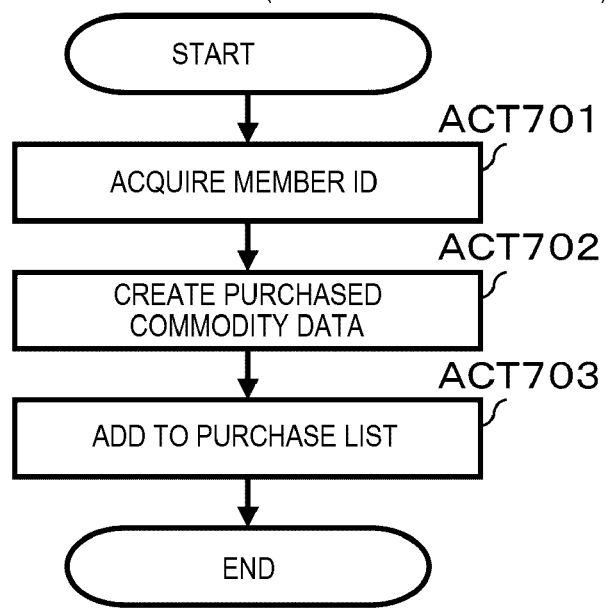
FIG. 19 is a flowchart illustrating an operation procedure of a sales management device to which a purchase notification command is input.

In the above embodiment, as an illustration, the integration processing unit 67 executes the processing of the procedure illustrated in the flowchart of FIG. 19 according to the exist notification command. Concerning this point, if receiving the settlement notification command including the member ID from the POS terminal connected to the communication network, the integration processing unit 67 may execute the processing in ACT 632 and subsequent acts of FIG. 19.

The shelf control device 6 is not limited to the configuration illustrated in FIG. 3. For example, a first computer device including the tracking processing unit 62, the personal authentication processing unit 63, the commodity monitoring processing unit 64, the action monitoring processing unit 65 and a second computer device including the integration processing unit 67 and the sound synthesizing unit 66 may be connected by a communication network to configure the shelf control device 6. Alternatively, the first computer device may be further subdivided. The sound synthesizing unit 66 may be excluded from the second computer device.

The several embodiments are described above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A customer authentication system, comprising:
a shelf having a product display section;
a display;
one or more sensors mounted on the shelf and configured to provide location information of one or more persons around the product display section;
a first customer authentication device provided on a first side of the product display section and configured to provide customer identification information;
a second customer authentication device provided on a second side of the product display section opposite to the first side and configured to provide customer identification information; and
a processing device configured to:
perform location tracking of the one or more persons around the product display section based on the location information from the one or more sensors;
based on the location tracking, determine a number of persons in a first predetermined area around the first customer authentication device;
enable customer authentication via the first customer authentication device when the determined number of persons is one;
disable customer authentication via the first customer authentication device and determine, based on the location tracking, whether a person is in a second predetermined area around the second customer authentication device, when the determined number of persons is greater than one; and
control the display to display a first error message if no person is in the second predetermined area and a second error message if there is a person in the second predetermined area, the second error message being different from the first error message.

2. The customer authentication system according to claim 1, wherein
the processing device is configured to start the location tracking of a person when the location information of the person indicates that the person has entered a third predetermined area around the product display region, and
the first and second predetermined areas are within the third predetermined area.

3. The customer authentication system according to claim 2, wherein the processing device is further configured to:
assign a tracking identifier (ID) to a person who enters into a fourth predetermined area around the product display region, the fourth predetermined area including the first predetermined area, and associate the tracking ID with a customer ID obtained via an authentication process based on customer identification information received by the first customer authentication device.

4. The customer authentication system according to claim 3, wherein the fourth predetermined area is within the third predetermined area.

5. The customer authentication system according to claim 1, wherein the one or more sensors include a camera positioned to capture images around the product display section.

6. The customer authentication system according to claim 1, wherein the first customer authentication device comprises a code reader configured to read a code symbol representing the customer identification information.

7. The customer authentication system according to claim 1, wherein the first customer authentication device is near a store entrance, and the first predetermined area includes the store entrance.

\* \* \* \* \*